(12) United States Patent  (10) Patent No.: US 8,757,819 B2
MacDonald et al.  (45) Date of Patent: Jun. 24, 2014

(54) CONVENIENTLY ASSEMBLABLE INTERACTIVE SYSTEMS AND DISPLAY DEVICE

(75) Inventors: Douglas MacDonald, Dawsonville, GA (US); John Helton, Powder Springs, GA (US); Dale Miller, Snellville, GA (US); Michael Boyle, Dacula, GA (US); Peter W. Hildebrandt, Duluth, GA (US); Johnny Fuglsang Jessen, Odense (DK); Edgar B. Montague, Charlotte, NC (US); JeanLuc Camarda, Ottawa (CA); Heinrik Soerensen Prang, Langeskov (DK)

(73) Assignee: Steelcase Inc., Grand Rapids, MI (US)

( * ) Notice: Subject to any disclaimer, the term of this patent is extended or adjusted under 35 U.S.C. 154(b) by 189 days.

(21) Appl. No.: 13/168,627

(22) Filed: Jun. 24, 2011

(65) Prior Publication Data

US 2012/0162870 A1   Jun. 28, 2012

Related U.S. Application Data

(60) Provisional application No. 61/358,796, filed on Jun. 25, 2010.

(51) Int. Cl.
*G03B 21/14* (2006.01)

(52) U.S. Cl.
USPC ............. 353/119; 353/74; 353/79; 353/122; 248/163.1; 248/178.1

(58) Field of Classification Search
USPC .......... 353/15, 17, 74, 79, 119, 122; 248/125, 248/178.1, 163.1, 166, 176.3, 440.1; 362/217.14, 370, 371; 361/679.01, 361/679.09; 349/5, 7–9
See application file for complete search history.

(56) References Cited

U.S. PATENT DOCUMENTS

| | | |
|---|---|---|
| 4,092,064 A | 5/1978 | Puel |
| 4,106,852 A | 8/1978 | Chasins |
| 4,705,247 A | 11/1987 | Delmerico |
| 5,908,182 A * | 6/1999 | Stang et al. ............... 248/188.2 |
| 6,179,426 B1 | 1/2001 | Rodriguez, Jr. et al. |
| 6,191,886 B1 | 2/2001 | Sinkoff |
| 6,311,944 B1 | 11/2001 | McKsymick et al. |
| 6,314,892 B1 | 11/2001 | Favini |
| 6,334,687 B1 | 1/2002 | Chino et al. |

(Continued)

FOREIGN PATENT DOCUMENTS

DE   9420815.8   2/1995

OTHER PUBLICATIONS

International Search Report and Written Opinion dated Jan. 15, 2013 for related PCT Patent Application No. PCT/US2011/041832.

*Primary Examiner* — Sultan Chowdhury
(74) *Attorney, Agent, or Firm* — Troutman Sanders LLP; Ryan Schneider

(57) ABSTRACT

Interactive systems can include various components that are packaged together and easily assemblable. An interactive system can comprise a mount, a display device, a projector, an input device, and a processing device. The display device, the projector, the input device, and the processing device can together provide an electronic display system, while the mount can carry these other various components and assist in connecting them to one another. The mount and the other components of the interactive system can be conveniently packaged and sold as group for convenient installation by one or two persons.

14 Claims, 32 Drawing Sheets

(56) References Cited

U.S. PATENT DOCUMENTS

| | | |
|---|---|---|
| 6,394,609 B1 | 5/2002 | Rodriguez, Jr. et al. |
| 6,394,610 B2 | 5/2002 | Rodriguez, Jr. |
| 6,466,369 B1 | 10/2002 | Maddock |
| 6,485,146 B2 | 11/2002 | Rodriguez, Jr. |
| 6,540,366 B2 | 4/2003 | Keenan et al. |
| 6,604,829 B2 | 8/2003 | Rodriguez, Jr. |
| 6,736,516 B1 | 5/2004 | Kepley, Jr. et al. |
| 7,290,888 B2 | 11/2007 | Kepley, Jr. et al. |
| 7,413,312 B2 | 8/2008 | Engle et al. |
| 7,434,938 B2 | 10/2008 | Schneider et al. |
| 7,489,444 B1 | 2/2009 | Adams et al. |
| 7,537,184 B1 | 5/2009 | Basilicato et al. |
| 7,602,549 B2 | 10/2009 | Yamauchi |
| 7,690,798 B2 | 4/2010 | Zakoji et al. |
| 7,980,737 B2 * | 7/2011 | Hu ................................ 362/382 |
| 8,439,508 B2 * | 5/2013 | Matsuo et al. ................ 353/119 |
| 2003/0123032 A1 * | 7/2003 | Rodriguez, Jr. ................ 353/74 |
| 2003/0169406 A1 | 9/2003 | Ben-Ari |
| 2005/0156952 A1 | 7/2005 | Orner et al. |
| 2006/0109199 A1 * | 5/2006 | Yee et al. ........................ 345/1.3 |
| 2006/0187423 A1 | 8/2006 | Hamilton et al. |
| 2006/0250692 A1 | 11/2006 | Peterson et al. |
| 2007/0171383 A1 | 7/2007 | Deves |
| 2008/0030853 A1 | 2/2008 | Creel |
| 2009/0015798 A1 | 1/2009 | Unsworth |
| 2009/0190212 A1 | 7/2009 | Wang et al. |
| 2009/0200439 A1 | 8/2009 | Bremmon et al. |
| 2009/0201434 A1 | 8/2009 | Yuzawa |
| 2010/0006732 A1 | 1/2010 | Weber et al. |
| 2010/0045943 A1 | 2/2010 | Gillespie |

* cited by examiner

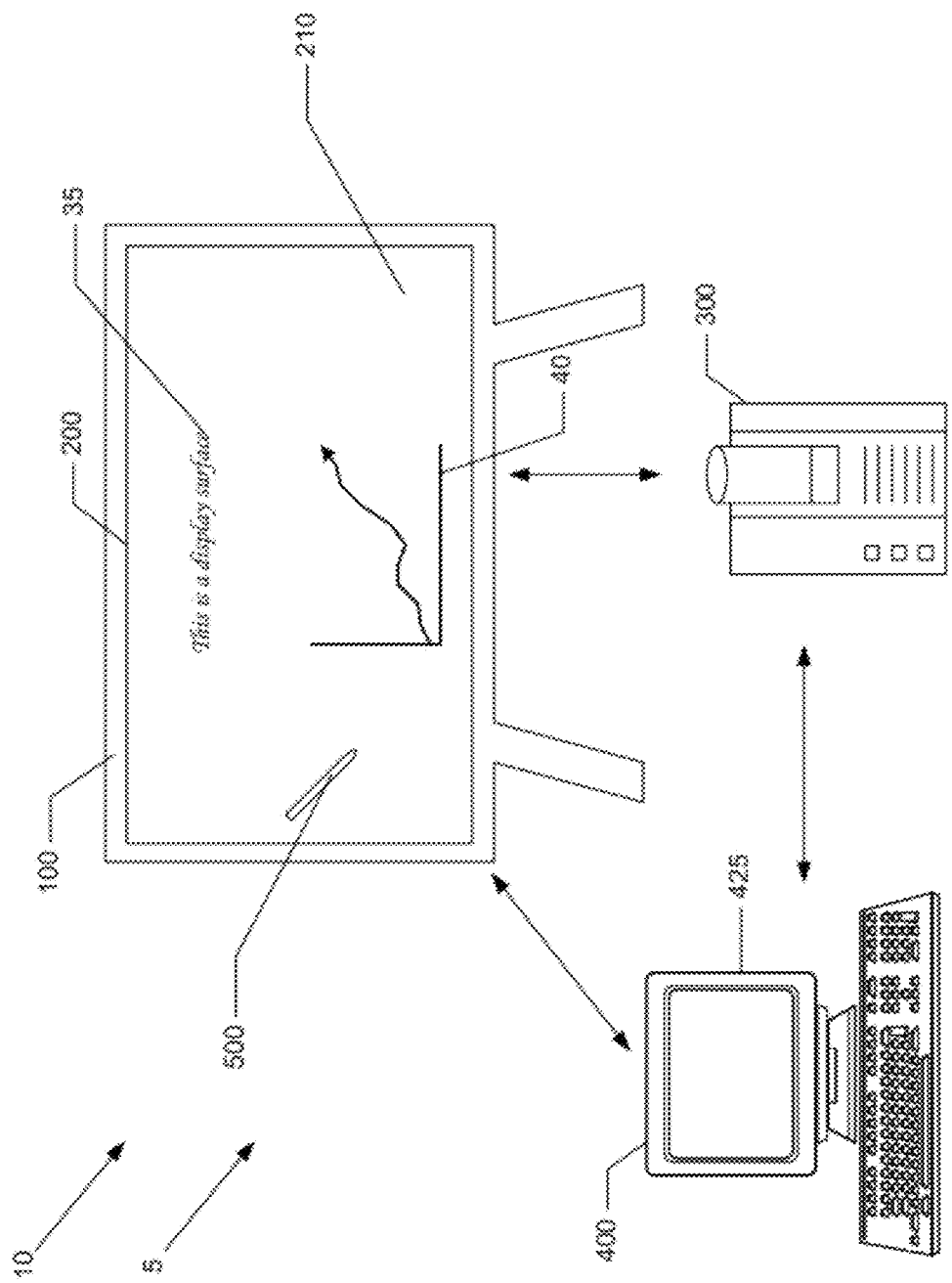

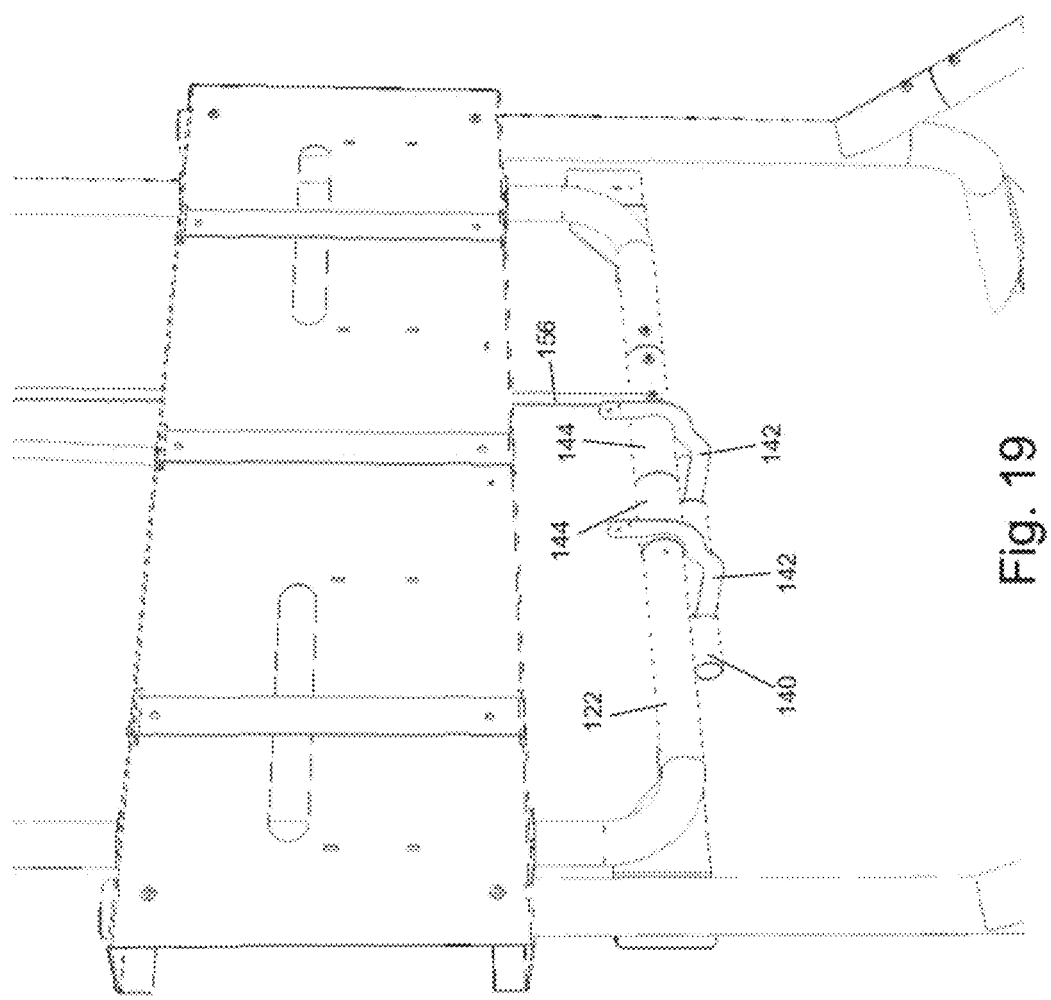

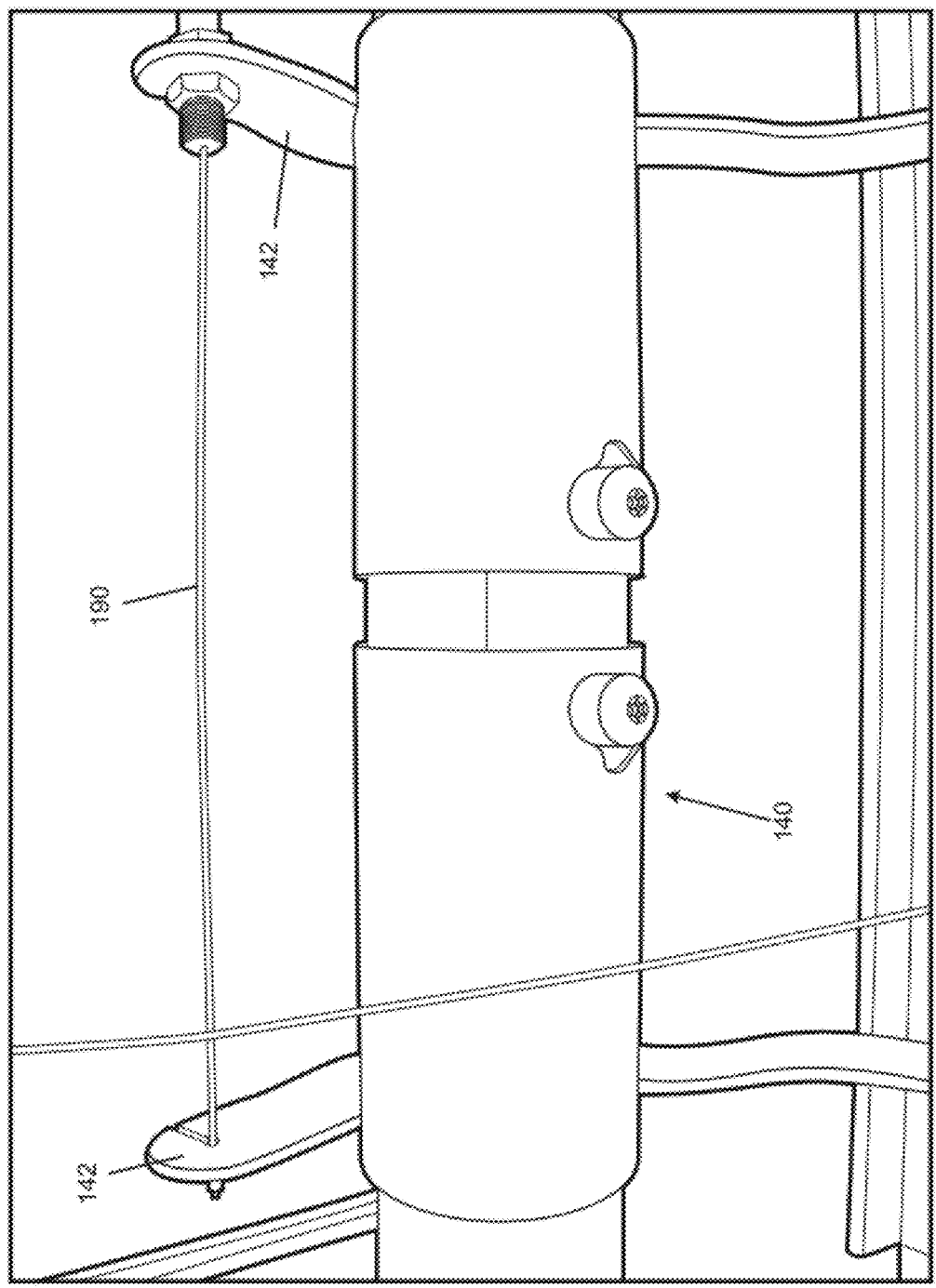

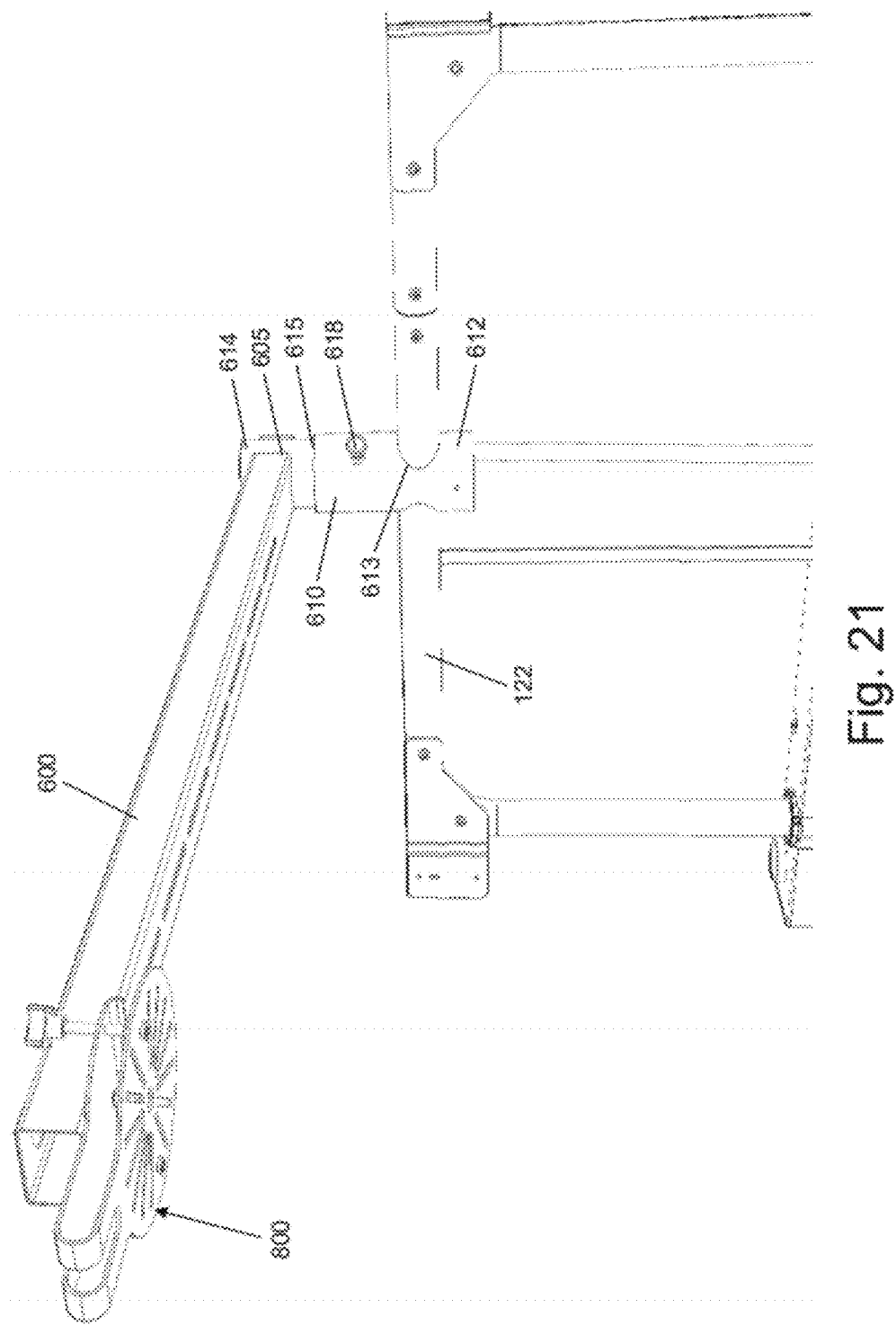

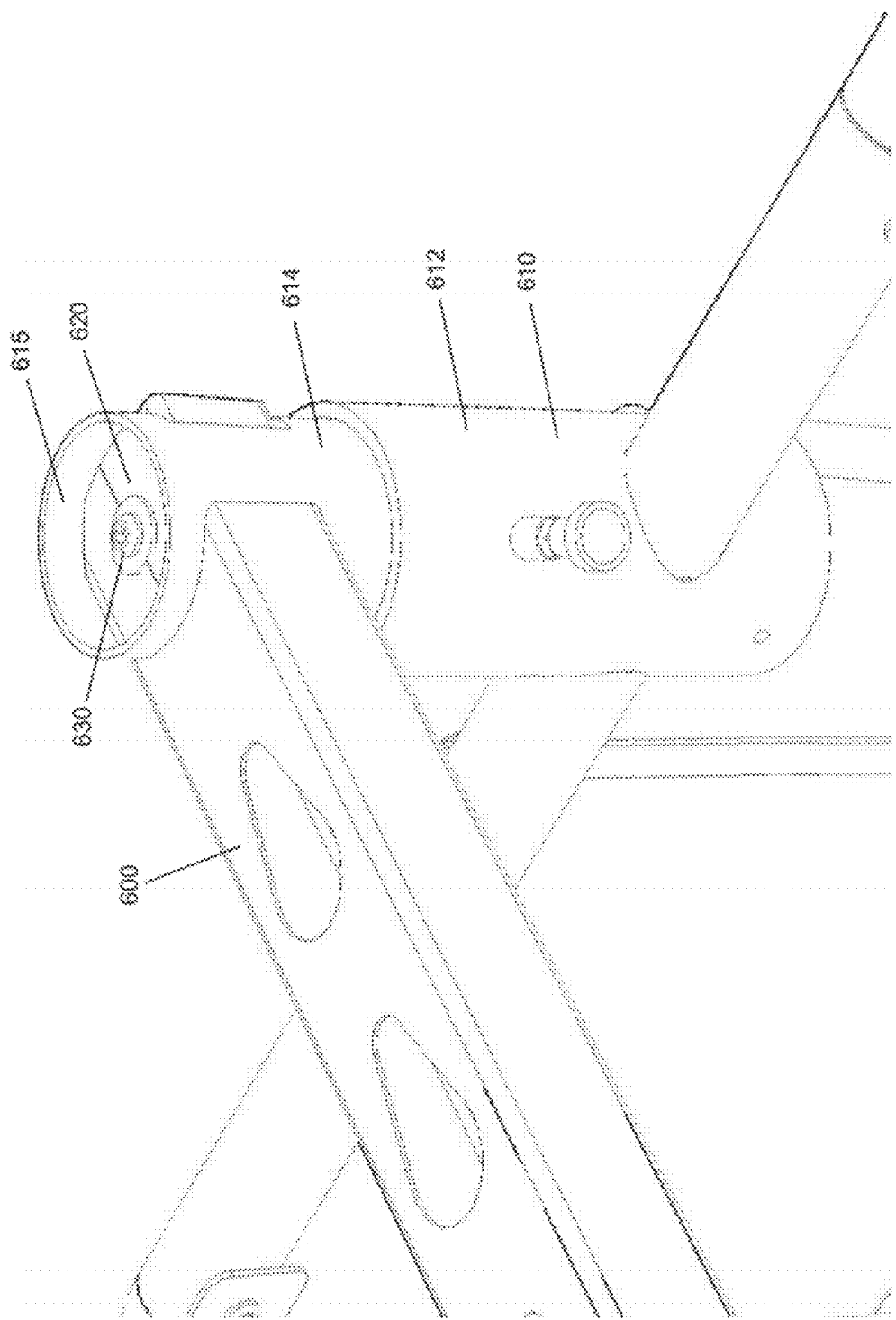

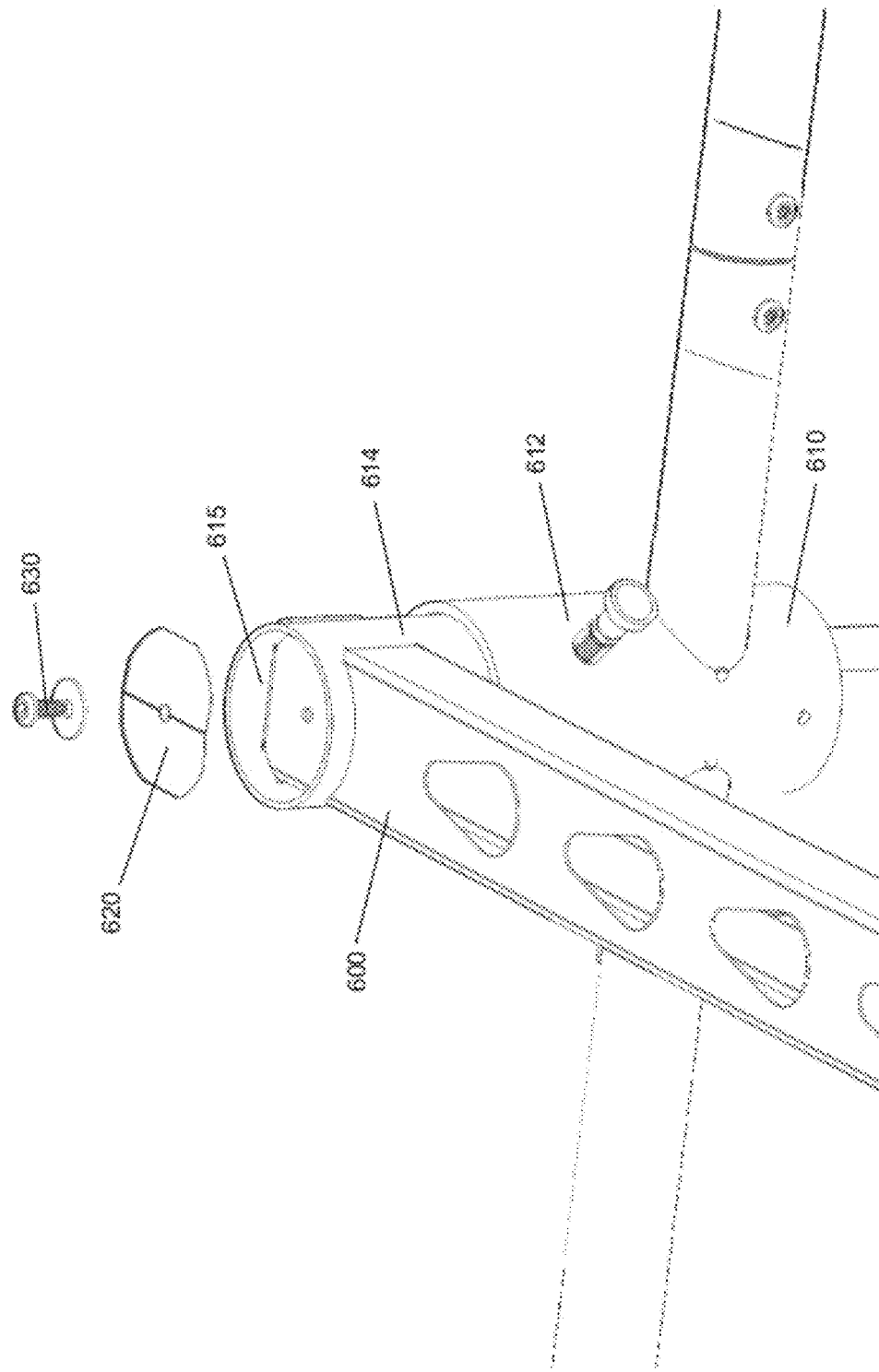

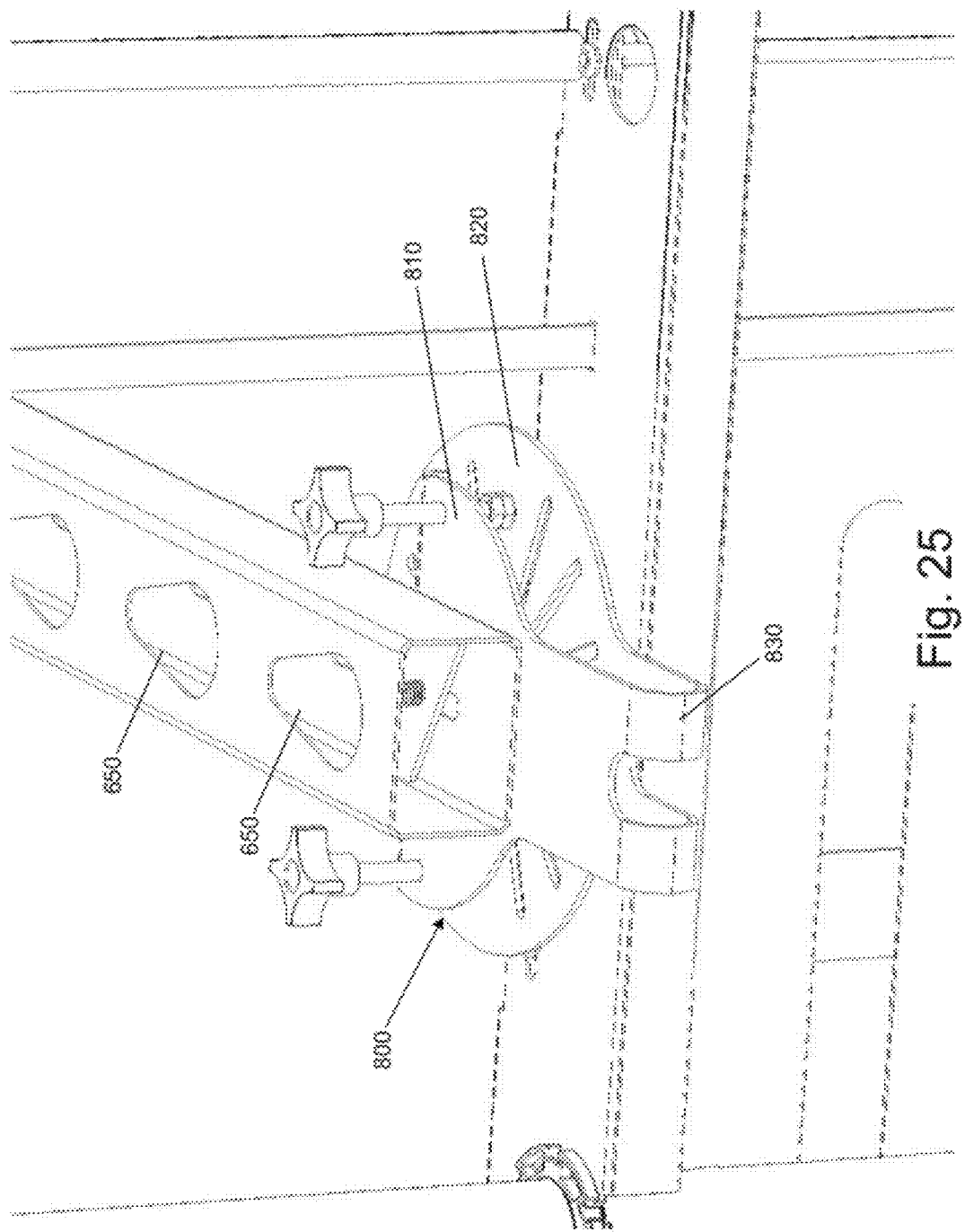

CONVENIENTLY ASSEMBLABLE INTERACTIVE SYSTEMS AND DISPLAY DEVICE

CROSS-REFERENCE TO RELATED APPLICATIONS

This application claims a benefit, under 35 U.S.C. §119(e), of U.S. Provisional Application Ser. No. 61/358,796, filed 25 Jun. 2010, the entire contents and substance of which is hereby incorporated by reference.

TECHNICAL FIELD

Various embodiments of the present invention relate to interactive systems and, more particularly, to interactive display systems comprising various conveniently assemblable components.

BACKGROUND

Electronic display systems, such as electronic whiteboard systems, are steadily becoming a preferred alternative to traditional whiteboard and marker systems. Unfortunately, progress from traditional display systems to more robust, electronic ones is hindered by the inconvenience of locating and installing the various components required in an electronic display system.

To install an electronic display system, one must first locate the individual components needed to make the electronic display system work. The process of locating components can require the installer to visit multiple websites or retail stores to order the correct parts, and research may be required to identify which components are compatible with one another. Because the components are sold separately, their prices are generally marked up for individual sale, and there is no cost savings for purchasing multiple different components that will make up the final electronic display system.

When all components are located and purchased, the components are generally packaged in separate boxes. The installer must unpack each box and determine the positioning of each component relative to the other components for desired performance of the electronic display system. Because the components may be bulky and heavy, multiple people may be required to properly unpack the components, install any necessary software, and position the components as desired. Thus, the process of purchasing and installing an electronic display system can be a long, expensive, and inconvenient process, undertaken by numerous people.

SUMMARY

Various embodiments of the present invention relate to interactive systems comprising components that are packaged together and easily assemblable. According to some exemplary embodiments of the present invention, an interactive system can comprise a mount, a display device, a projector, an input device, and a processing device. Some or all of these components of the interactive system can be packaged together and conveniently assembled by a user.

The display device, the projector, the input device, and the processing device can together provide an electronic display system, whereby interactions between the input device and the display device can be captured, analyzed by the processing device, and then represented in an image projected onto the display device. These interactions can be digitally captured for present or future use, such as displaying, printing, or editing.

The mount can carry one or more of the display device, the projector, the input device, and the processing device, thus enabling these other components of the interactive system to be easily installed for communication with one another. The mount can comprise a stand, a carriage system, and a boom. The stand can be a substantially fixed distance from the floor, and the carriage system can be moveably attached to the stand, such that the distance between the carriage system and the floor can vary as desired by a user. The input device and the processing device can be carried by the stand of the mount, such as by being receivable by a utility tray attached to the stand. The carriage system can be configured to carry both the display device and the projector. Thus, by adjusting the vertical position of the carriage system, the user can likewise adjust the vertical position of the display device and the projector.

The boom of the mount can carry the projector and extend from the carriage system. The boom and attached projector can thereby move relative to the stand of the mount, along with the carriage system. The boom can enable the projector to be further adjustable relative to the carriage system and independently from the display device, so as to enable a user to direct the projector at the display device as desired. Because the boom can be attached to the carriage system, the projector can remain in a fixed position relative the display device when the carriage system is adjusted. Resultantly, adjustments made to the position or orientation of the projector relative to the display device can be maintained when the carriage system is adjusted.

Components of the interactive system can be conveniently packaged together and sold in combination. The mount can be configured to be collapsible, such that the mount fits into a box that can be carried by one or two persons. In some embodiments, other components of the interactive system can be packaged along with the mount. In a further exemplary embodiment, one or two persons can unpack and install the entire interactive system in no more than approximately ten minutes.

These and other objects, features, and advantages of the mounting system will become more apparent upon reading the following specification in conjunction with the accompanying drawing figures.

BRIEF DESCRIPTION OF THE FIGURES

FIG. 1 illustrates a diagram of an interactive system, according to an exemplary embodiment of the present invention.

FIG. 19 illustrates a back perspective view of the locking system, according to an exemplary embodiment of the present invention.

FIGS. 20A-20E illustrate various aspects of the locking system, according to an exemplary embodiment of the present invention.

FIG. 21 illustrates a front perspective view of a boom of the interactive system, according to an exemplary embodiment of the present invention.

FIG. 22 illustrates a front perspective view of a turret supporting the boom of the interactive system, according to an exemplary embodiment of the present invention.

FIG. 23 illustrates a top perspective, partially-exploded view of the turret, according to an exemplary embodiment of the present invention.

FIG. 25 illustrates a top perspective view of the projector mount, according to an exemplary embodiment of the present invention.

DETAILED DESCRIPTION

Figure 2A:
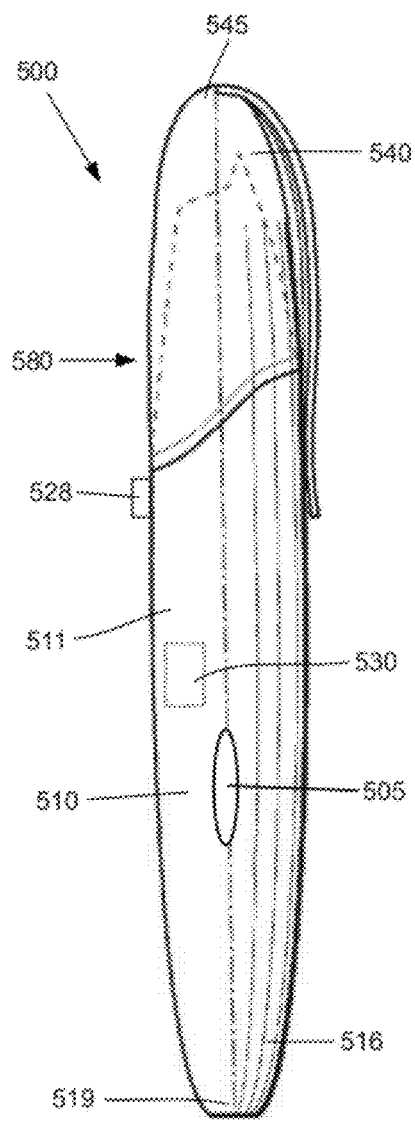
FIG. 2A illustrates a partial cross-sectional side view of a capped input device of the interactive system, according to an exemplary embodiment of the present invention.

To facilitate an understanding of the principles and features of the invention, various illustrative embodiments are explained below. In particular, the invention is described in the context of being an interactive display system comprising a display device, a projector, and input device, and processing device. Embodiments of the invention, however, are not limited to systems with these components. Rather, various aspects of the present invention can apply to non-interactive system, and to interactive systems comprising various components different from those described herein. For example and not limitation, instead of including a projector in the interactive system, the display device can comprise an integrated image display system.

The materials and components described hereinafter as making up elements of the invention are intended to be illustrative and not restrictive. Many suitable materials and components that would perform the same or similar functions as the materials and components described herein are intended to be embraced within the scope of the invention. Other materials and components not described herein can include, but are not limited to, for example, similar or analogous materials or components developed after development of the invention.

Various embodiments of the present invention can include conveniently packaged and assemblable interactive systems. Referring now to the figures, in which like reference numerals represent like parts throughout the views, various embodiments of an interactive system will be described in detail.

FIG. 1 illustrates a diagram an interactive system 10, according to an exemplary embodiment of the present invention. As shown, the interactive system 10 can comprise a mount 100, a display device 200, a projector 300, a processing device 400, and an input device 500. The display device 200, the projector 300, the processing device 400, and the input device 500 can make up all or a portion of an electronic display system 5, which can be conveniently installed in a room through use of the mount 100. The mount 100 can carry the display device 200, upon which the projector 300 can cast projected images. A user of the interactive system can use the input device 500 to interact with the display device 200. Those interactions can be captured by the input device 500 and interpreted by the processing device 400, which can instruct the projector 300 to update an image projected onto the display device 200 based on the interactions.

The projector 300 can project one or more display images onto a display surface 210 of the display device 200. For example and not limitation, the projector 300 can project a graphical user interface or markings created through use of the input device 500. The projector 300 can be in communication with the processing device 400. Such communication can be by means of a wired or wireless connection, Bluetooth, or by many other means through which two devices can communicate. Like the processing device 400, the projector 300 can, but need not, be integrated into the display device 200. Alternatively, the projector 300 can be excluded from the interactive system 10 if the display device 200 is internally capable of displaying markings and other objects on its surface. For example, if the display device 200 is a computer monitor comprising a liquid crystal display, then a separate projector 300 need not be provided.

In some exemplary embodiments of the interactive system 10, the projector 300 can be a short throw projector or ultra-short throw projector configured to be positioned relatively close to the display device 200 during operation of the interactive system 10. When positioned close to the display device 200, the space between the projector 300 and the display device 200, over which light from the projector 300 can be cast, is less likely to be interrupted by the user of the interactive system 10. Thus, using a short throw projector 300 in the interactive system 10 can enable a user to approach the display device 200 without blocking an image projected onto the display surface 210.

The electronic display system 5 can capture markings on the display surface 210 of the display device 200 made by the input device 500. These markings can be detected when the input device 500 is placed in proximity to or contacts the display surface 210. The display device 200 can comprise one of resistive membrane technology, capacitive technology, cameras in proximity to corners of the display device 200, position-coding technology, or some other means for capturing coordinates of the input device 500.

Figure 5A:
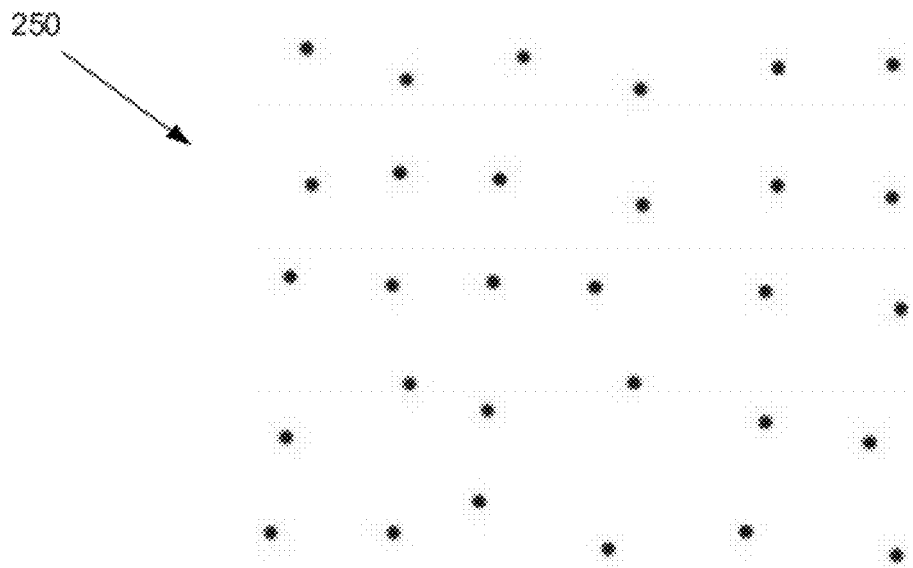
FIGS. 5A-5C illustrate various images of a dot pattern, as captured by a sensing device of the input device, according to an exemplary embodiment of the present invention.
Figure 5B:
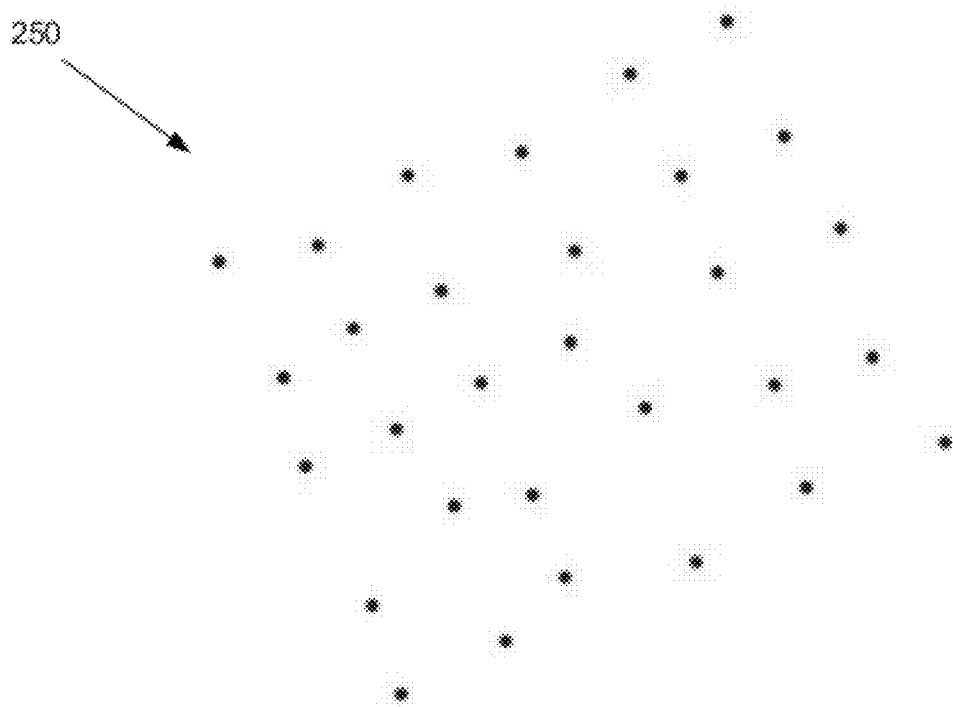
Figure 5C:
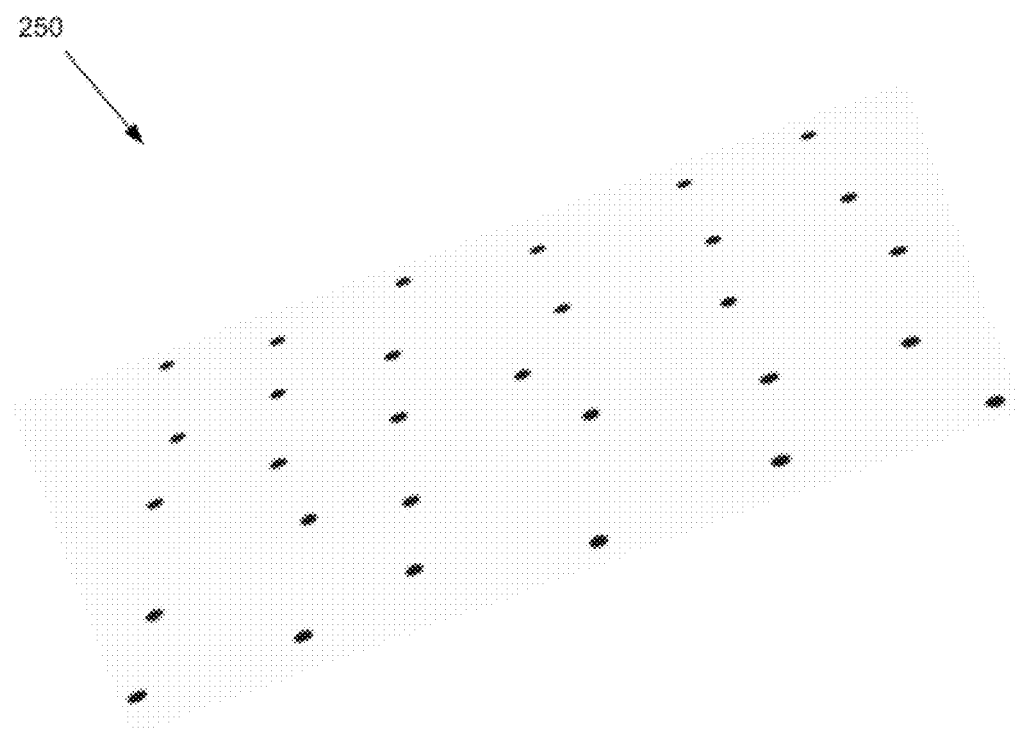

In an exemplary embodiment, the display device 200 can comprise a position-coding pattern 250, such as the dot pattern illustrated in FIGS. 5A-5C, on its display surface 210. The pattern 250 can be detectable by the input device 500 when the input device 500 is used to interact with the display surface 210. Through analyzing a detected portion of the pattern 200 on the display surface 210, the input device 500 can determine information about its position and orientation relative to the display surface 210.

When the user causes interactions between the input device 500 and the display surface 210, data describing these interactions can be transmitted from the input device 500 to the processing device 400. The processing device 400 can thus receive data, such as coordinates or other indicia of the input device's posture, from the input device 500 and can interpret that data as operations on the display surface 210. The processing device 400 can determine how to update an image projected onto the display surface 210 by the projector 300, based on interpretation of the input device's movements. The processing device 400 can then transmit an updated image to the projector 300. In some embodiments, the processing device 400 can be an integrated component of the display device 200, but in other embodiments, the processing device 400 can be an external component, for example, a notebook computer or other personal computer 425. To perform one or more of the above operations, the processing device 400 can comprise a computer program product embodied in a computer readable medium or computer storage device. The computer program product can provide instructions for a computer processor to perform some or all the above operations.

Upon receiving an updated image from the processing device 400, the projector 300 can project the updated image onto the display surface 210, so as to display results of the interactions between the input device 500 and the display surface 210. Accordingly, the interactive system 10 can cause an operation to be performed on the display surface 210 in accordance with movements of the input device 500. For example and not limitation, markings can be generated in the path of the input device 500, or the input device 500 can direct a cursor across the display surface 210.

The input device 500 can be activated by many means, for example, by an actuator, such as a switch or button, or by proximity of the input device 500 to the display surface 210. While activated, placement or movement of the input device 500 in contact with, or in proximity to, the display surface 210 can indicate to the processing device 400 that certain operations are to occur at indicated points on the display surface 210. For example, when the input device 500 contacts the display surface 210, the input device 500 can transmit its coordinates on the display surface 210 to the processing device 400. Accordingly, the display system 5 can cause an operation to be performed on the display surface 210 at the coordinates of the input device 500. For example and not limitation, markings can be generated in the path of the input device 500, or the input device 500 can direct a cursor across the display surface 210.

Through interacting with the display surface 210, the input device 500 can generate markings on the display surface 210, which markings can be physical, digital, or both. For example, when the input device 500 moves across the display surface 210, the input device 500 can leave physical markings, such as dry-erase ink, in its path. The display surface 210 can be adapted to receive such physical markings. For example, and not limitation, the display surface 210 can be a whiteboard surface, and the display device 200 can be a whiteboard. Additionally, movement of the input device 500 can be analyzed to create a digital version of such markings. The digital markings can be stored by the display system 5 for later recall, such as for emailing, printing, or displaying. The display surface 210 can, but need not, display the digital markings at the time of their generation, such that digital markings generally overlap the physical markings.

The complete image displayed on the display surface 210 can comprise both real ink 35 and virtual ink 40. The real ink 35 comprises the markings, physical and digital, generated by the input device 500 and other marking implements. The virtual ink 40 comprises other objects projected, or otherwise displayed, onto the display surface 210. These other objects can include, without limitation, a graphical user interface or windows of an application running on the display system 5. Real ink 35 and virtual ink 40 can overlap, and consequently, real ink 35 can be used to annotate objects in virtual ink 40.

Figure 2B:
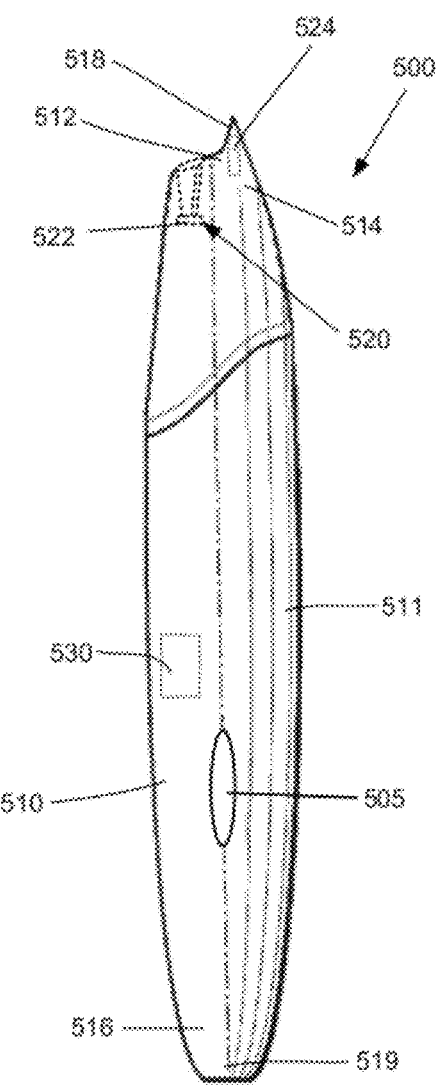
FIG. 2B illustrates a partial cross-sectional side view of the input device without a cap, according to an exemplary embodiment of the present invention.

FIGS. 2A-2B illustrate partial cross-sectional side views of the input device 500. The input device 500 can comprise a body 510, a nib 518, a sensing system 520, a communication system 530, and a cap 540. Further, the input device 500 has two or more states, and each state corresponds to an operating mode of the input device 500.

The body 510 can provide structural support for the input device 500. The body 510 can comprise a shell 511, as shown, to house inner-workings of the input device 500, or alternatively, the body 510 can comprise a primarily solid member for carrying components of the input device 500. The body 510 can be composed of many materials. For example, the body 510 can be plastic, metal, resin, or a combination thereof, or many materials that provide protection to the components or the overall structure of the input device 500. The body 510 can further include a metal compartment for electrically shielding some or all of the sensitive electronic components of the device. The input device 500 can have many of shapes consistent with its use. For example, the input device 500 can have an elongated shape, similar to the shape of a conventional writing instrument, such as a pen, or a thicker design, such as a dry-erase marker.

The body 510 can comprise a first end portion 512, which is a head 514 of the body 510, and a second end portion 516, which is a tail 519 of the body 510. The head 514 is interactable with the display surface 210 during operation of the input device 500.

The nib 518 can be positioned at the tip of the head 514 of the input device 500, and can be adapted to be placed in proximity to, contact, or otherwise indicate, a point on the display surface 210. For example, as a user writes with the input device 500 on the display surface 210, the nib 518 can contact the display surface 210, as the tip of a pen would contact a piece of paper. While contact with the display surface 210 may provide for a comfortable similarity to writing with a conventional pen and paper, or whiteboard and dry-erase marker, contact of the nib 518 to the display surface 210 need not be required for operation of the input device 500. For example, once the input device 500 is activated, the user can hover the input device 500 in proximity to the display surface 210, or point from a distance, as with a laser pointer.

The nib 518 can comprise a marking tip, such as the tip of a dry-erase marker or pen. Accordingly, contact or proximity of the nib 518 to the display surface 210 can result in physical marking of the display surface 210.

The sensing system 520 can sense indicia of the posture of the input device 500. The input device 500 has six degrees of potential movement. In the two-dimensional coordinate system of the display surface 210, the input device 500 can move in the horizontal and vertical directions. The input device 500 can also move normal to the display surface 210, and can rotate about the horizontal, vertical, and normal axes. These rotations are commonly referred to, respectively, as the roll, yaw, and tilt of the input device 500. The sensing system 520 can sense all, or one or more combinations of, these six degrees of movement.

The term "tipping" as used herein, refers to angling of the input device 500 away from normal to the display surface 210, and, therefore, includes rotations about the horizontal and vertical axes, i.e., the roll and the yaw of the input device 500. On the other hand, "orientation," as used herein, refers to rotation parallel to the plane of the display surface 210 and, therefore, about the normal axis, i.e., the tilt of the input device 500.

The sensing system 520 can be coupled to, and in communication with, the body 510. The sensing system 520 can have many implementations adapted to sense indicia of the posture of the input device 500 with respect to the display surface 210. For example, the sensing system 520 can sense data indicative of the distance of the input device 500 from the display surface 210, as well as the position, orientation, tipping, or a combination thereof, of the input device 500 with respect to the display surface 210.

As shown, the sensing system can include a first sensing device 522 and a second sensing device 524. Each sensing device 522 and 524 can be adapted to sense indicia of the posture of the input device 500. Further, each sensing device 522 and 524 can individually detect data for determining the posture of the input device 500 or, alternatively, can detect such data in conjunction with other components, such as another sensing device.

The first sensing device 522 can be a surface sensing device for sensing the posture of the input device 500 based on properties of the display surface 210. The surface sensing device 522 can be, or can comprise, a camera. The surface sensing device 522 can detect portions of a pattern 250 (see FIGS. 5A-5C) on the display surface 210, such as a dot pattern or a dot matrix position-coding pattern. Detection by the surface sensing device 522 can comprise viewing, or capturing an image of, a portion of the pattern 250.

Additionally or alternatively, the sensing system 520 can comprise an optical sensor, such as that conventionally used in an optical mouse. In that case, the sensing system 520 can comprise light-emitting diodes and photodiodes, or a CMOS camera, to detect movement relative to the display surface 210.

The surface sensing device 522 can be in communication with the body 510 of the input device 500, and can have many positions and orientations with respect to the body 510. For example, the surface sensing device 522 can be housed in the head 514, as shown. Additionally or alternatively, the surface sensing device 522 can be positioned on, or housed in, many other portions of the body 540.

The second sensing device 524 can be a contact sensor. The contact sensor 524 can sense when the input device 500 contacts a surface, such as the display surface 210. The contact sensor 524 can be in communication with the body 510 and, additionally, with the nib 518. The contact sensor 524 can comprise, for example and not limitation, a switch that closes a circuit when a portion of the input device 500, such as the nib 518 contacts a surface with predetermined pressure. Accordingly, when the input device 500 contacts the display surface 210, the display system 5 can determine that an operation is indicated.

To facilitate analysis of data sensed by the sensing system 520, the input device 500 can further include a communication system 530 adapted to transmit information to the processing device 400 and to receive information from the processing device 400. For example, if processing of sensed data is conducted by the processing device 400, the communication system 530 can transfer sensed data to the processing device 400 for such processing. The communication system 530 can comprise, for example, a transmitter, a receiver, or a transceiver. Many wired or wireless technologies can be implemented by the communication system 530. For example, the communication system 530 can implement Bluetooth or 802.11b technology.

The cap 540 can be releasably securable to the body 510 in one or more predetermined positions relative to the body 510. For example, and not limitation, the cap can be securable to the head 514 of the body 510, such as to cover the nib 518. The cap 540 can be adapted to protect the nib 518 and components of the input device 500 proximate the head 514, such as the surface sensing device 522. The cap 540 can also be securable to the tail 519 of the body, such as for storage of the cap 540 while the nib 518 interacts with the display surface 210.

Use of the cap 540 can result in at least two states of the input device 500. For example, the input device 500 can have a cap-on state, in which the cap 540 is secured to the head 514, and a cap-off state, in which the cap 540 is not secured to the head 514. In some embodiments, a cap-stored state can result when the cap 540 is secured to the tail 519 of the input device 500. Alternatively, no cap-stored state need exist, and securing the cap 540 to the tail 519 can result in a cap-off state.

The input device 500 can detect presence of the cap 540 in a predetermined position in many ways. For instance, the cap 540 can include electrical contacts that interface with corresponding contacts on the body 510, or the cap 540 can include geometric features that engage a detente switch of the body 510. Also, presence of the cap 540 can be indicated manually or detected by a cap sensor 542 (see FIG. 3), by distance of the nib 518 from the display surface 210, or by the surface sensing device 522.

The user can manually indicate to the whiteboard system that the input device 500 is in a cap-on state. For example, the input device can comprise an actuator 505, such as a button or switch, for the user to actuate to indicate the state of the input device 500 with respect to the cap 540.

Figure 3:
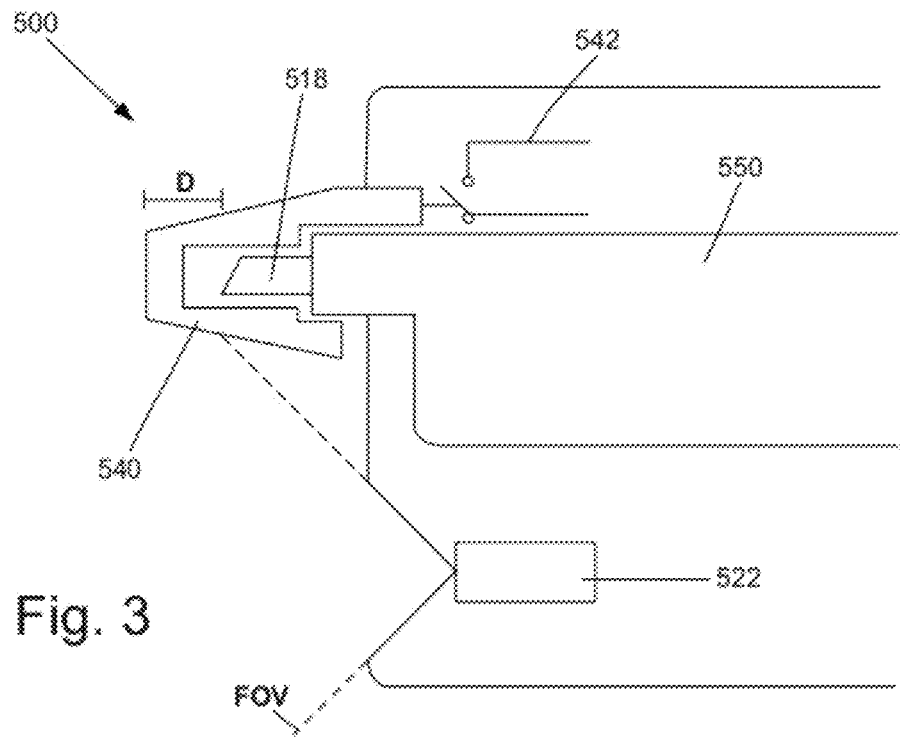
FIG. 3 illustrates a partial cross-sectional side view of a portion of the input device, according to an exemplary embodiment of the present invention.

FIG. 3 illustrates a cross-sectional side view of the head 514 of the input device 500. As shown in FIG. 3, the input device 500 can comprise a cap sensor 542. The cap sensor 542 can comprise, for example, a pressure switch, such that when the cap 540 is secured over the nib 518, the switch closes a circuit, thereby indicating that the cap 540 is secured. Further, the cap sensor 542 can be a pressure sensor and can sense when the cap is on and contacting a surface, such as the display surface 210. A first degree of pressure at the cap sensor 542 can indicate presence of the cap 540 over the nib 518, while a higher degree of pressure can indicate that the cap is on and in contact with, or pressing against, a surface. The cap sensor 542 can be positioned in the body 510, as shown, or in the cap 540.

Whether the input device 500 is in cap-on mode can be further determined from the distance of the nib 518 to the display surface 210. When the cap 540 is removed, the nib is able to contact the display surface 210, but when the cap 540 is in place, the nib 518 cannot reach the display surface 210 because the cap 540 obstructs this contact. Accordingly, when the nib 518 contacts the display surface 210, it can be determined that the cap 540 is off. Further, there can exist a predetermined threshold distance D such that, when the nib 518 is within the threshold distance D from the display surface, the input device 500 is determined to be in a cap-off state. On the other hand, if the nib 518 is outside of the threshold distance D, the cap may be secured over the nib 518.

Additionally or alternatively, the surface sensing device 522 can detect the presence or absence of the cap 540 over the nib 518. When secured over the nib 518, the cap 540 can be within the range, or field of view FOV, of the surface sensing device 522. Therefore, the surface sensing device can sense the cap 540 when the cap 540 is over the nib 518, and the display system 5 can respond accordingly.

One or more states of the input device 500, such as cap-on and cap-off states, can correspond to one or more operating modes of the input device 500. Securing of the cap 540 over the nib 518 can indicate to the display system 5 that the operating mode has changed. The input device 500 can have many operating modes, including, without limitation, a marking mode and a pointing mode.

In the marking mode, the input device 500 can mark the display surface 210, digitally, physically, or both. For example, the input device 500 can be used to write or draw on the display surface 210. In the pointing mode, the input device 500 can perform in a manner similar to that of a computer mouse. The input device 500 can, for example, drive a graphical user interface, or direct a cursor about the display surface 210 to move and select displayed elements for operation. Accordingly, the input device 500 comprises a mode-indicating system 580, which incorporates the cap 540.

Referring now back to FIGS. 2A-2B, if the surface sensing device 522 is housed in, or proximate, the head 514, it is desirable that the cap 540 not obstruct sensing when the cap 540 is secured over the nib 518. To facilitate sensing of indicia of the posture of the input device 500 when the cap 540 is secured over the nib 518, the cap 540 can comprise a translucent or transparent portion 545.

Alternatively, the surface sensing device 522 can be positioned such that the display surface 210 is visible to the surface sensing device 522 regardless is whether the cap 540 is secured over the nib 518. For example, the surface sensing device 522 can be carried by the body 510 at a position not coverable by the cap 540, such as at position 528.

Figure 4A:
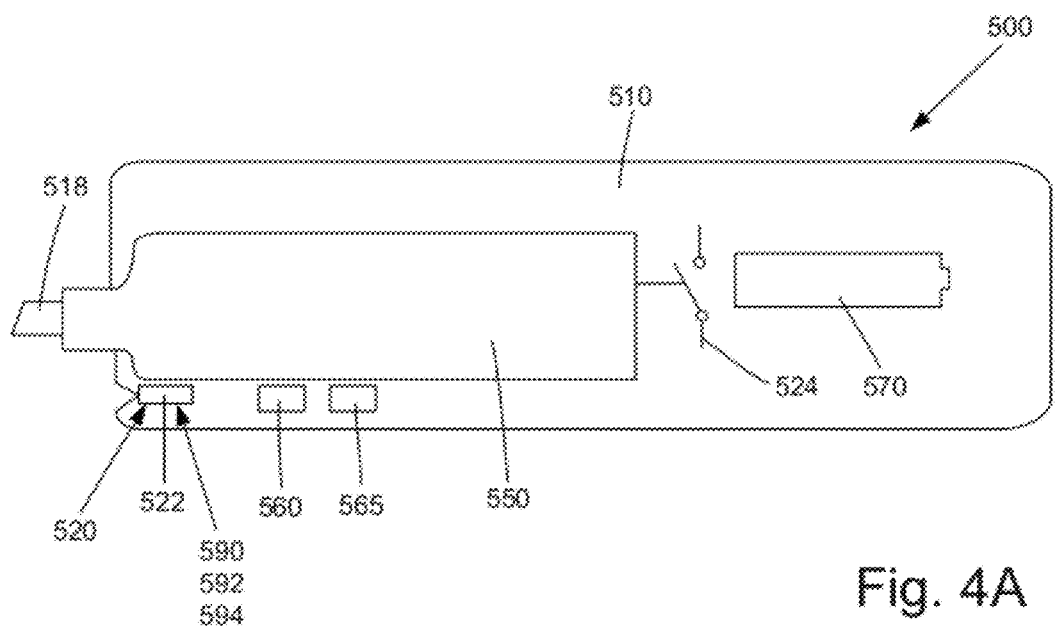
FIG. 4A illustrates a partial cross-sectional side view of the input device without a cap, according to an exemplary embodiment of the present invention.
Figure 4B:
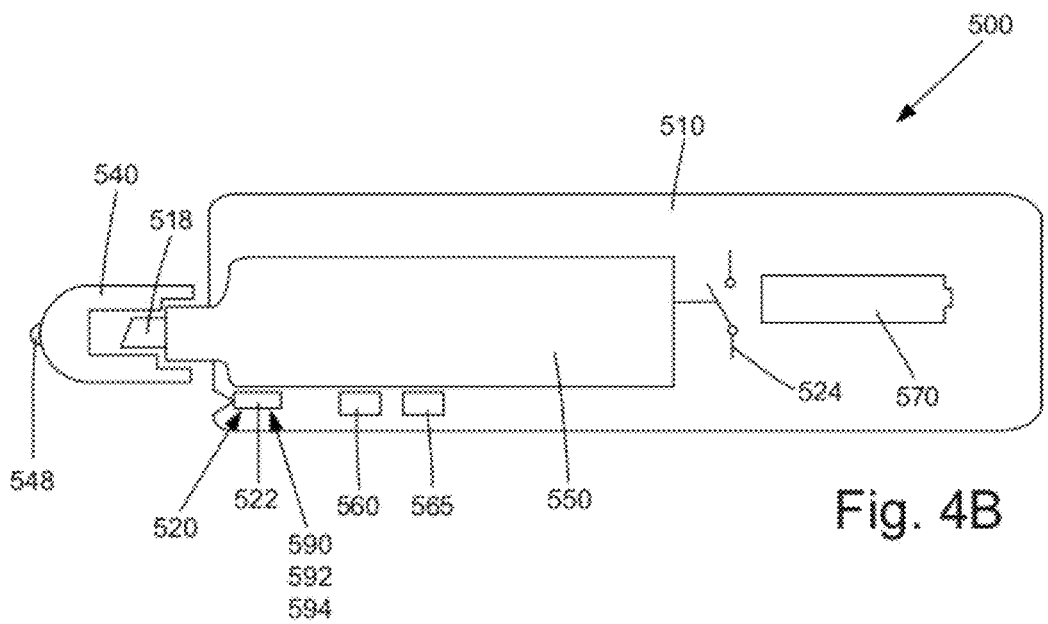
FIGS. 4B-4C illustrate partial cross-sectional side views of the input device with a cap, according to exemplary embodiments of the present invention.
Figure 4C:
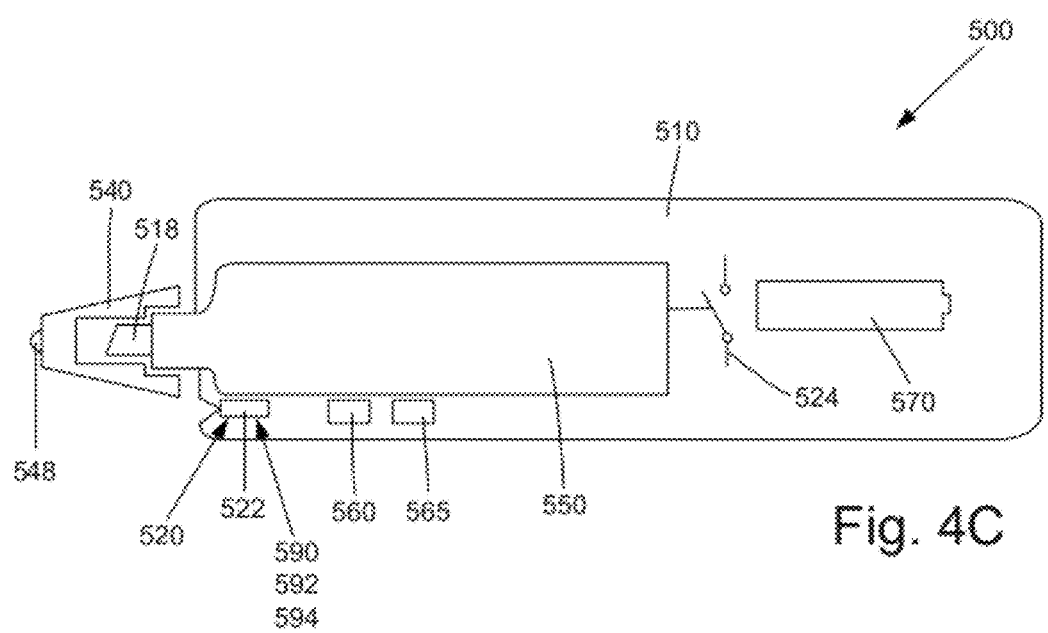

FIGS. 4A-4C illustrate another embodiment of the input device. As shown in FIG. 4A, in addition to the above features, the input device can further comprise a marking cartridge 550, an internal processing unit 560, memory 565, a power supply 570, or a combination thereof. The various components can be electrically coupled as necessary.

The marking cartridge 550 can be provided to enable the input device 500 to physically mark the display surface 210. The marking cartridge 550, or ink cartridge or ink well, can contain a removable ink, such as conventional dry-erase ink. The marking cartridge 550 can provide a comfortable, familiar medium for generating handwritten strokes on the display surface 210 while movement of the input device 500 generates digital markings.

The internal processing unit 560 can be adapted to calculate the posture of the input device 500 from data received by the sensing system 520, including determining the relative or absolute position of the input device 500 in the coordinate system of the display surface 210. The internal processing unit 560 can also execute instructions for the input device 500. The internal processing unit 560 can comprise many processors capable of performing functions associated with various aspects of the invention.

The internal processing unit 560 can process data detected by the sensing system 520. Such processing can result in determination of, for example: distance of the input device 500 from the display surface 210; position of the input device 500 in the coordinate system of the display surface 210; roll, tilt, and yaw of the input device 500 with respect to the display surface 210, and, accordingly, tipping and orientation of the input device 500.

The memory 565 can comprise RAM, ROM, or many types of memory devices adapted to store data or software for controlling the input device 500 or for processing data.

The power supply 570 can provide power to the input device 500. The power supply 570 can be incorporated into the input device 500 in any number of locations. If the power supply 570 is replaceable, such as one or more batteries, the power supply 570 is preferably positioned for easy access to facilitate removal and replacement of the power supply 570. Alternatively, the input device 500 can be coupled to alternate power supplies, such as an adapter for electrically coupling the input device 500 to a car battery, a wall outlet, a computer, or many other power supplies.

The cap 540 can comprise many shapes, such as the curved shape depicted in FIG. 4B or the faceted shape of FIG. 4C. The shape of the cap 540, however, is preferably adapted to protect the nib 518 of the input device 500.

The cap 540 can further comprise a stylus tip 548. The stylus tip 548 of the cap 540 can be interactable with the display surface 210. When the stylus tip 548 contacts or comes in proximity to the display surface 210, the input device can operate on the display surface 210, for example, by directing a cursor across the display surface 210.

Multiple caps 540 can be provided, and securing of each cap 540 over the nib 518 can result in a distinct state of the input device 500. Further, in addition to indicating a change in operating mode of the input device 500, a cap 540 can provide additional functionality to the input device 500. For example, the cap 540 can provide one or more lenses, which can alter the focal length of the surface sensing device 522. In another example, the cap 540 can be equipped with a metal tip, such as the stylus tip 548, for facilitating resistive sensing, such that the input device 500 can be used with a touch-sensitive device.

As shown, the surface sensing device 522 need not be coverable by the cap 540. Placement of the surface sensing device 522 outside of the range of the cap 540 can allow for more accurate detection of the display surface 210. Further, such placement of the surface sensing device 522 can result in the cap 540 providing a lesser obstruction to the surface sensing device 522 when the cap 540 is secured over the nib 518.

Referring back to the sensing system 520, the contact sensor 524, if provided, can detect when a particular portion of the input device 500, such as the nib 518, contacts a surface, such as the display surface 210. The contact sensor 524 can be a contact switch, such that when the nib 518 contacts the display surface 210, a circuit closes, indicating that the input device 500 is in contact with the display surface 210. The contact sensor 524 can also be a force sensor, which can detect whether the input device 500 presses against the display surface 210 with a light force or a hard force. The display system 5 can react differently based on the degree of force used. If the force is below a certain threshold, the display system 5 can, for example, recognize that the input device drives a cursor. On the other hand, when the force is above a certain threshold, which can occur when the user presses the input device 500 to the board, the display system 5 can register a selection, similar to a mouse click. Further, the display system 5 can vary the width of markings generated by the input device 500 based on the degree of force with which the input device 500 contacts the display surface 210.

Additionally, the surface sensing device 522 can include, for example, a complementary metal oxide semiconductor (CMOS) image sensor, a charge-coupled device (CCD) image sensor, or many other types of sensors for receiving image information. The surface sensing device 522 can be a CMOS or CCD image-sensor array having a size of, for example, 528 by 500, 528 by 528, or larger. The sensing system 520 enables the input device 500 to generate digital markings by detecting posture and movement of the pen with respect to the display surface 210. For example and not limitation, the surface sensing device 522 can capture images of the display surface 210 as the pen is moved, and through image analysis, the display system 5 can detect the posture and movement of the input device 500.

The display surface 210 can include many types of image data indicating relative or absolute positions of the input device 500 in the coordinate system of the display surface 210. For example, the display surface 210 can comprise a known image, which can include alphanumeric characters, a coding pattern, or many discernable patterns of image data capable of indicating relative or absolute position. The implemented pattern can indicate either the position of the input device 500 relative to a previous position, or can indicate an absolute position of the input device 500 in the coordinate system of the display surface 210.

Determining a point on the display surface 210 indicated by the input device 500 can require determining the overall posture of the input device 500. The posture of the input device 500 can include the position, orientation, tipping, or a combination thereof, of the input device 500 with respect to the display surface 210. In marking mode, it may be sufficient to determine only the position of the input device 500 in the coordinate system of the display surface 210. When pointing is required, however, as in pointer mode, the orientation and tipping of the input device 500 can be required to determine the indicated point on the display surface 210.

As such, various detection systems can be provided in the input device 500 for detecting the posture of the input device 500. For example, a tipping detection system 590 can be provided in the input device 500 to detect the angle and direction at which the input device 500 is tipped with respect to the display surface 210. An orientation detection system 592 can be implemented to detect rotation of the input device 500 in the coordinate system of the display surface 210. Additionally, a distance detection system 594 can be provided to detect the distance of the input device 500 from the display surface 210.

These detection systems 590, 592, and 594 can be incorporated into the sensing system 520. For example, the position, tipping, orientation, and distance of the input device 500 with respect to the display surface 210 can be determined, respectively, by the position, skew, rotation, and size of the appearance of the pattern 250 on the display surface 210, as viewed from the surface sensing device 522. For example, FIGS. 5A-5C illustrate various views of an exemplary dot pattern 250 on the display surface 210. The dot pattern 250 serves as a position-coding pattern in the display system 5.

FIG. 5A illustrates an image of an exemplary position-coding pattern 250, which is a dot pattern. It is known that some dot patterns can provide indication of an absolute position in a coordinate system of the display surface 210. In the image of FIG. 5A, the dot pattern 250 is viewed at an angle normal to the display surface 210. This is how the dot pattern 250 could appear from the surface sensing device 522, when the surface sensing device 522 is directed normal to the display surface 210. In the image, the dot pattern 250 appears in an upright orientation and not angled away from the surface sensing device 522. As such, when the surface sensing device 522 captures such an image, the display system 5 can determine that the input device 500 is normal to the display surface 210 and, therefore, points approximately directly into the display surface 210.

As the input device 500 moves away from the display surface 210, the size of the dots, as well as the distance between the dots, in the captured image decreases. Analogously, as the input device 500 moves toward the display surface 210, the size of the dots, along with the distance between the dots, appears to increase. As such, in addition to sensing the tipping and orientation of the input device 500, the surface sensing device 522 can sense the distance of the input device 500 from the display surface 210.

FIG. 5B illustrates a rotated image of the dot pattern 250. A rotated dot pattern 250 indicates that the input device 500 is rotated about a normal axis of the display surface 210. For example, when a captured image depicts the dot pattern 250 rotated at an angle of 30 degrees clockwise, it can be determined that the input device 500 is oriented at an angle of 30 degrees counter-clockwise. As with the image of FIG. 5A, this image was taken with the surface sensing device 522 oriented normal to the display surface 210, so even though the input device 500 is rotated, the input device 500 still points approximately directly into the display surface 210.

FIG. 5C illustrates a third image of the dot pattern 250 as viewed by the surface sensing device 522. The flattened image, depicting dots angled away from the surface sensing device 522, indicates that the surface sensing device 522 is not normal to the display surface 210. Further, the rotation of the dot pattern 250 indicates that the input device 500 is rotated about the normal axis of the display surface 210 as well. The image can be analyzed to determine the tipping angle and direction as well as the orientation angle. For example, it may be determined that the input device 500 is tipped downward 45 degrees, and then rotated 25 degrees. These angles determine to which point on the display surface 210 the input device 500 is directed.

Accordingly, by determining the angles at which an image received from the surface sensing device 522 was captured, the display system 5 can determine points indicated by the input device 500.

Figure 6A:
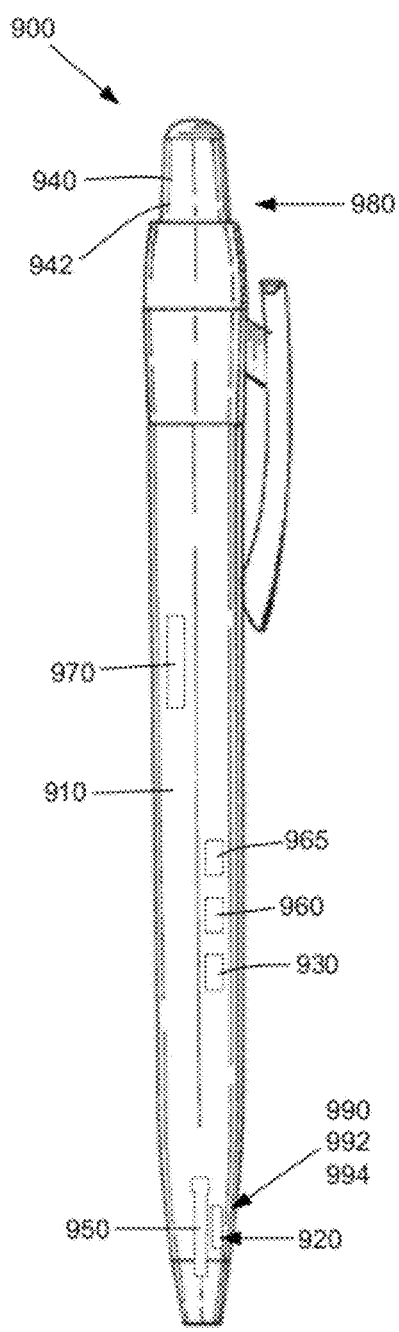
FIG. 6A illustrates a partial cross-sectional side view of the input device with a nib retracted, according to an exemplary embodiment of the present invention.
Figure 6B:
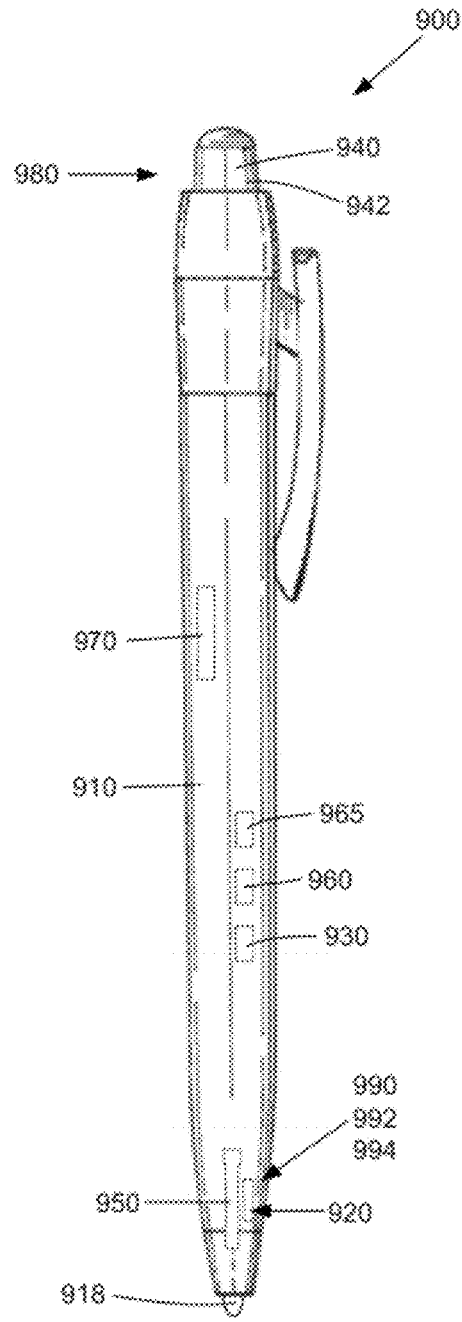
FIG. 6B illustrates a partial cross-sectional side view of the input device with the nib extended, according to an exemplary embodiment of the present invention.

FIGS. 6A-6B illustrate partial cross-sectional side views of an embodiment of the input device 500, a retractable input device 900, implementing a retractable nib 918. FIG. 6A illustrates the retractable input device 900 with a nib 918 retracted, while FIG. 6B shows the retractable input device 900 with the nib 918 extended.

Like the embodiment of the input device 500 described above, the retractable input device 900 comprises a body 910, a nib 918, a sensing system 920, and a communication system 930, and can further comprise a marking cartridge 950, an internal processing unit 960, memory 965, a power supply 970, a tipping detection system 990, an orientation detection system 992, a distance detection system 994, or a combination thereof, all as described above.

Additionally, as shown, the retractable input device 900 can comprise a reciprocator 940. The reciprocator 940 can comprise an actuator 942, such as a button, adapted to extend and retract the nib 918. Alternate presses of the button 942 result in alternate positions of the nib 918. For example, when the button 942 is depressed a first time, as in FIG. 6B, the nib 918 extends, and when the button 942 is depressed a second time, as in FIG. 6A, the nib 918 retracts.

Like the cap 540, the reciprocator 940 can be incorporated in the mode-indicating system 980. The reciprocator 940 can define states of the retractable input device 900. For example, the retractable input device 900 can be in a retracted state or in an extended state, based on, respectively, whether the nib 918 is retracted or extended. Each state can correspond to an operating mode. For example and not limitation, when the retractable input device 900 is in the retracted state, the retractable input device 900 can operate in pointing mode. In contrast, when the retractable input device 900 is in the extended state, the retractable input device 900 can operate in marking mode. In marking mode, the nib 918 can be used as a marker and can generate both digital and physical markings.

Figure 7:
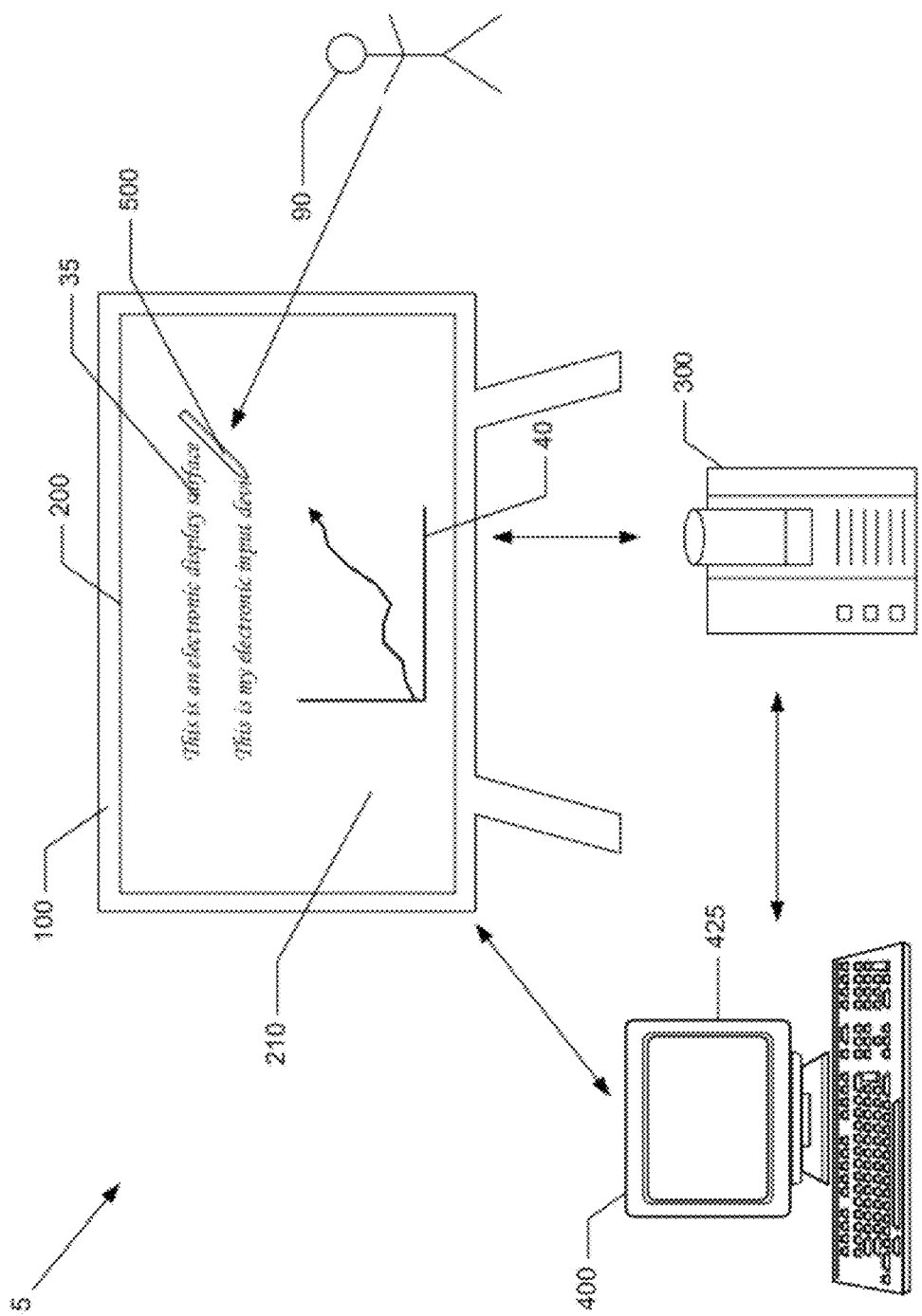
FIG. 7 illustrates a method of using the input device, according to an exemplary embodiment of the present invention.

FIG. 7 illustrates a method of using the input device 500 in the display system 5. At a moment in time, the display surface 210 can display an image communicated from the processing device 400. If a projector 300 is provided, a portion of such image can be communicated from the processing device 400 to the projector 300, and then projected by the projector 300 onto the display surface 210. The display image can include real ink 35, such as physical and digital markings produced by the input device 500, as well as virtual ink 40.

In an exemplary embodiment, a user 90 can initiate further marking by bringing a portion of the input device 500 in sufficient proximity to the display surface 210, or by placing a portion of the input device 500 in contact with the display surface 210. To mark the display surface 210 in marking mode, the user 90 can move the input device 500 along the display surface 210. This movement can result in real ink 35, which can be represented digitally and physically on the display surface 210. Alternatively, in pointing mode, movement of the input device 500 along the surface 210 can result in, for example, movement of a cursor. Such movement can be similar to movement of a mouse cursor across a graphical user interface of a personal computer.

As the input device 500 travels along the display surface 210, the sensing system 520 periodically senses data indicating the changing posture of the input device 500 with respect to the display surface 210. This data is then processed by the display system 5. In one embodiment, the internal processing unit 560 of the input device 500 processes the data. In another embodiment, the data is transferred to the processing device 400 by the communication system 530 of the input device 500, and the data is then processed by the processing device 400. Processing of such data can result in determining the posture of the input device 500 and, therefore, can result in determining areas of the display surface 210 on which to operate. If processing occurs in the internal processing unit 560 of the input device 500, the results are transferred to the processing device 400 by the communication system 530.

Based on determination of relevant variables, the processing device 400 produces a revised image to be displayed onto the display surface 210. In marking mode, the revised image can incorporate a set of markings not previously displayed, but newly generated by use of the input device 500. Alternatively, the revised image can be the same as the previous image, but can appear different because of the addition of physical markings Such physical markings, while not necessarily projected onto the display surface 210, are recorded by the processing device 400.

In pointing mode, the revised image can incorporate, for example, updated placement of the cursor. The display surface 210 is then refreshed, which can involve the processing device 400 communicating the revised image to the optional projector 300. Accordingly, operations and digital markings indicated by the input device 500 can be displayed through the electronic display system 5. In one embodiment, this occurs in real time.

Figure 8:
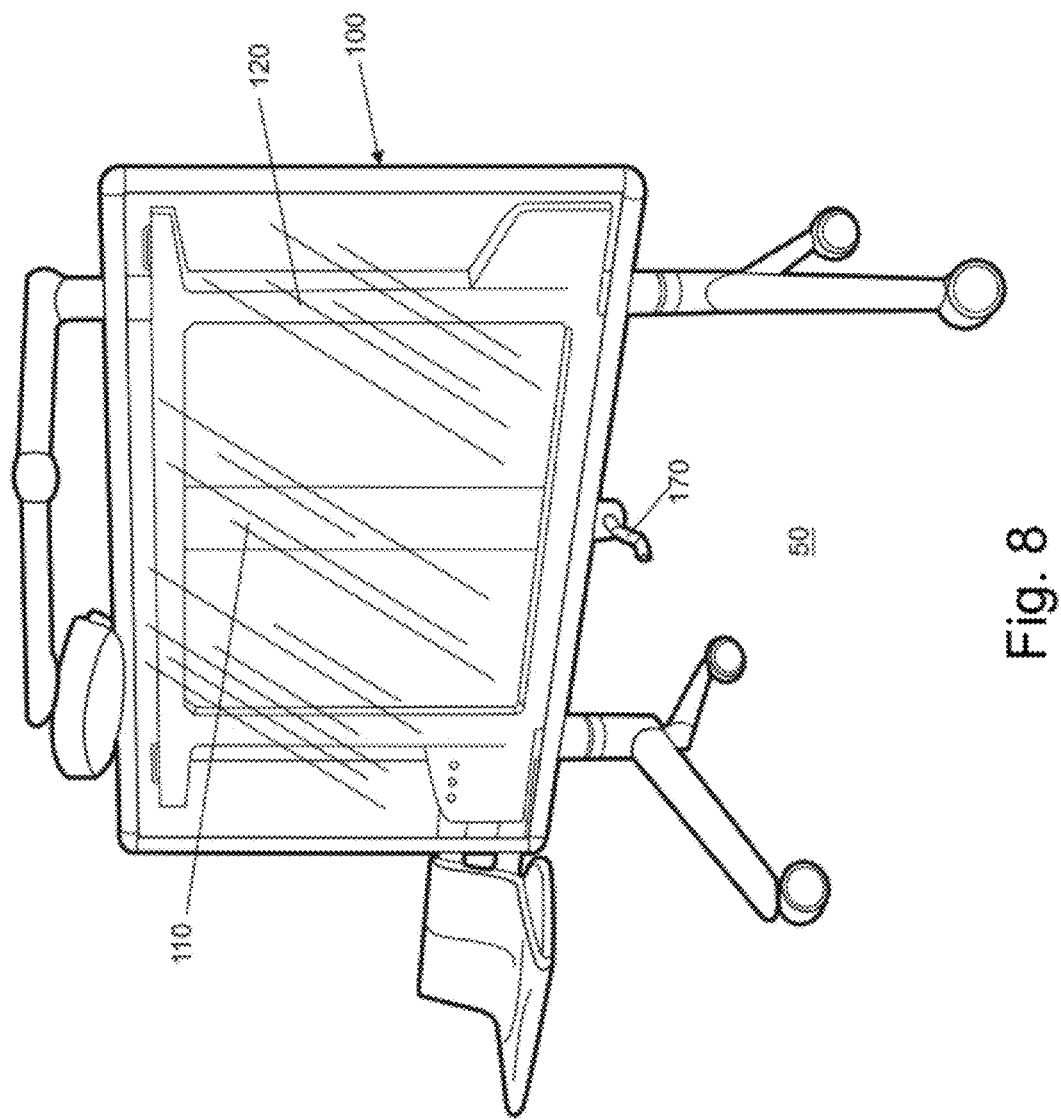
FIG. 8 illustrates a perspective view of the interactive system comprising a mobile base, according to an exemplary embodiment of the present invention.
Figure 9:
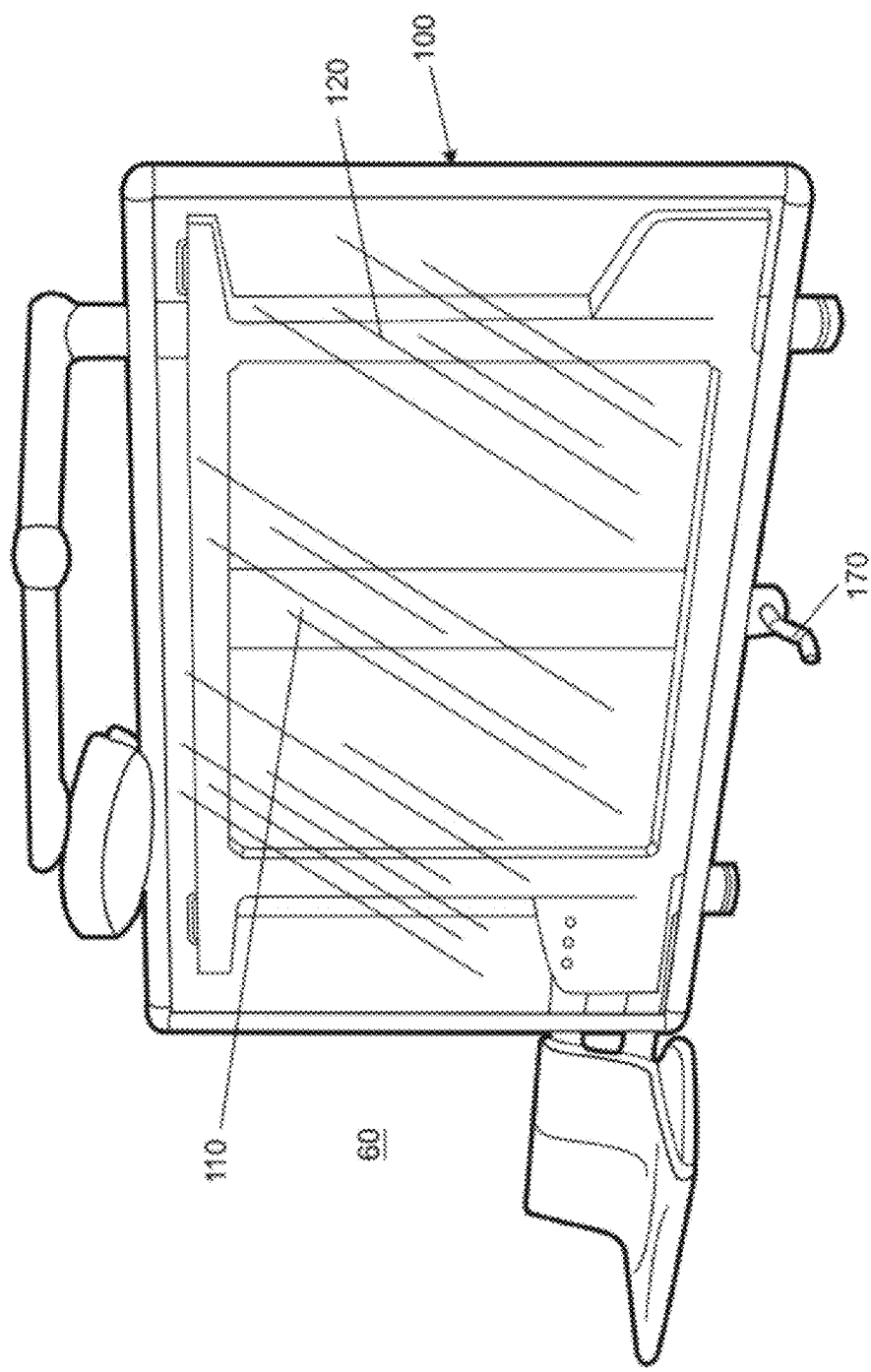
FIG. 9 illustrates a perspective view of the interactive system mounted to a vertical surface, according to an exemplary embodiment of the present invention.

FIGS. 8-9 illustrate exemplary embodiments of the interactive system 10, the embodiment of FIG. 2 being supportable by a floor 50, and the embodiment of FIG. 3 being mountable on a wall 60. As shown in FIGS. 8-9, the mount 100 can comprise a stand 110 and a carriage system 120. The stand 110 can support the weight of the interactive system 10 and can maintain the interactive system 10 on a wall 60 or other vertical surface, as in FIG. 3, or over the floor 50 or other generally horizontal surface. Regardless of whether the mount 100 stands on the floor 50 or is mounted to the wall 60, the distance between the bottom of the stand 110 and the floor 50 can be substantially constant while the interactive system 10 is in use. In FIG. 2, for example, the stand 110 is positioned directly on top of the floor 50, and thus, the distance between the stand 110 and the floor 50 is zero. Alternatively, in FIG. 3, the stand 110 is mounted to a wall 60 at a fixed height above the floor 50, and the distance between the bottom of the stand 110 and the floor 50 is equal to that fixed height above the floor 50.

Figure 10:
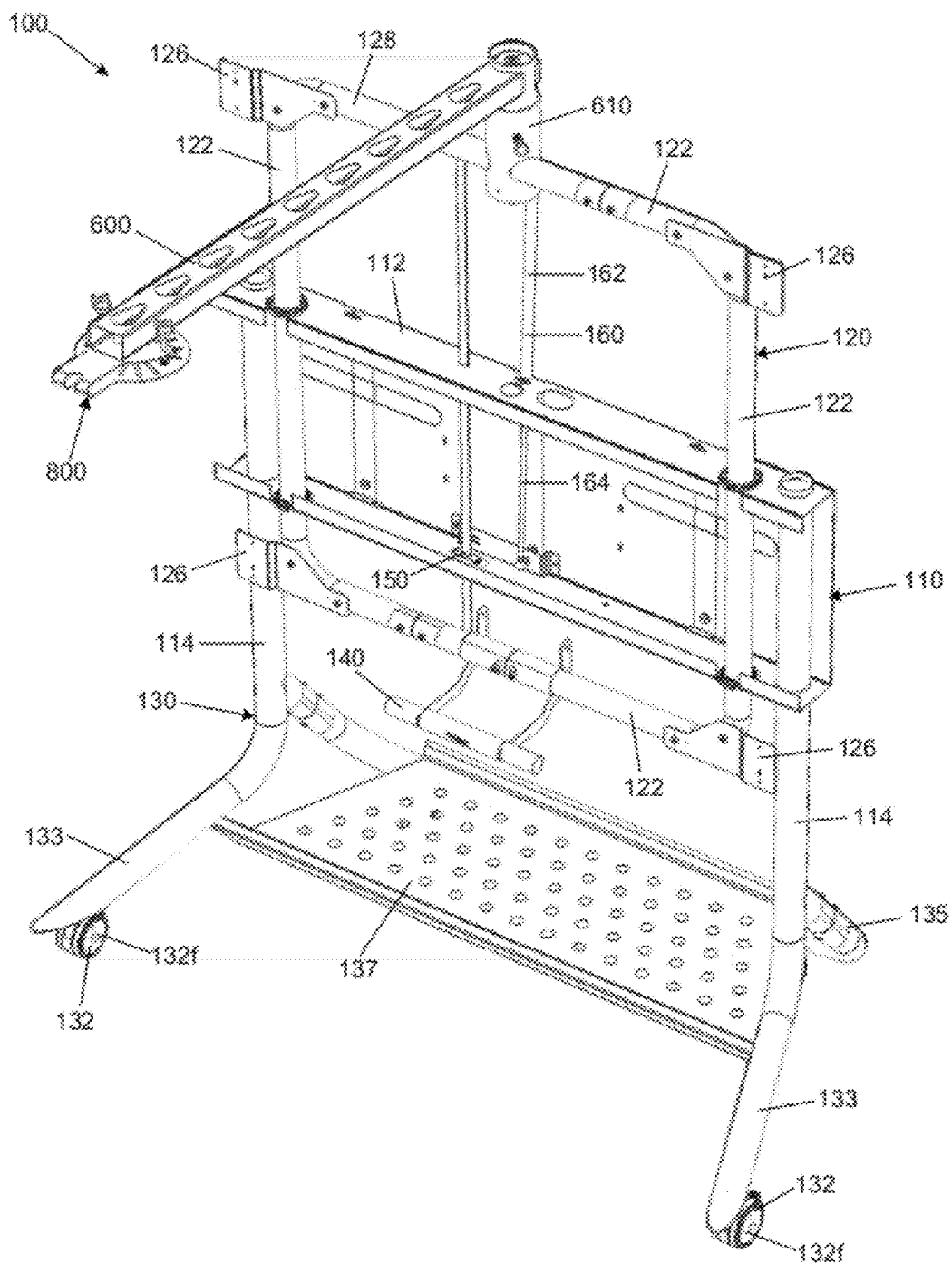
FIG. 10 illustrates a front perspective view of a mount of the interactive system, according to an exemplary embodiment of the present invention.
Figure 11:
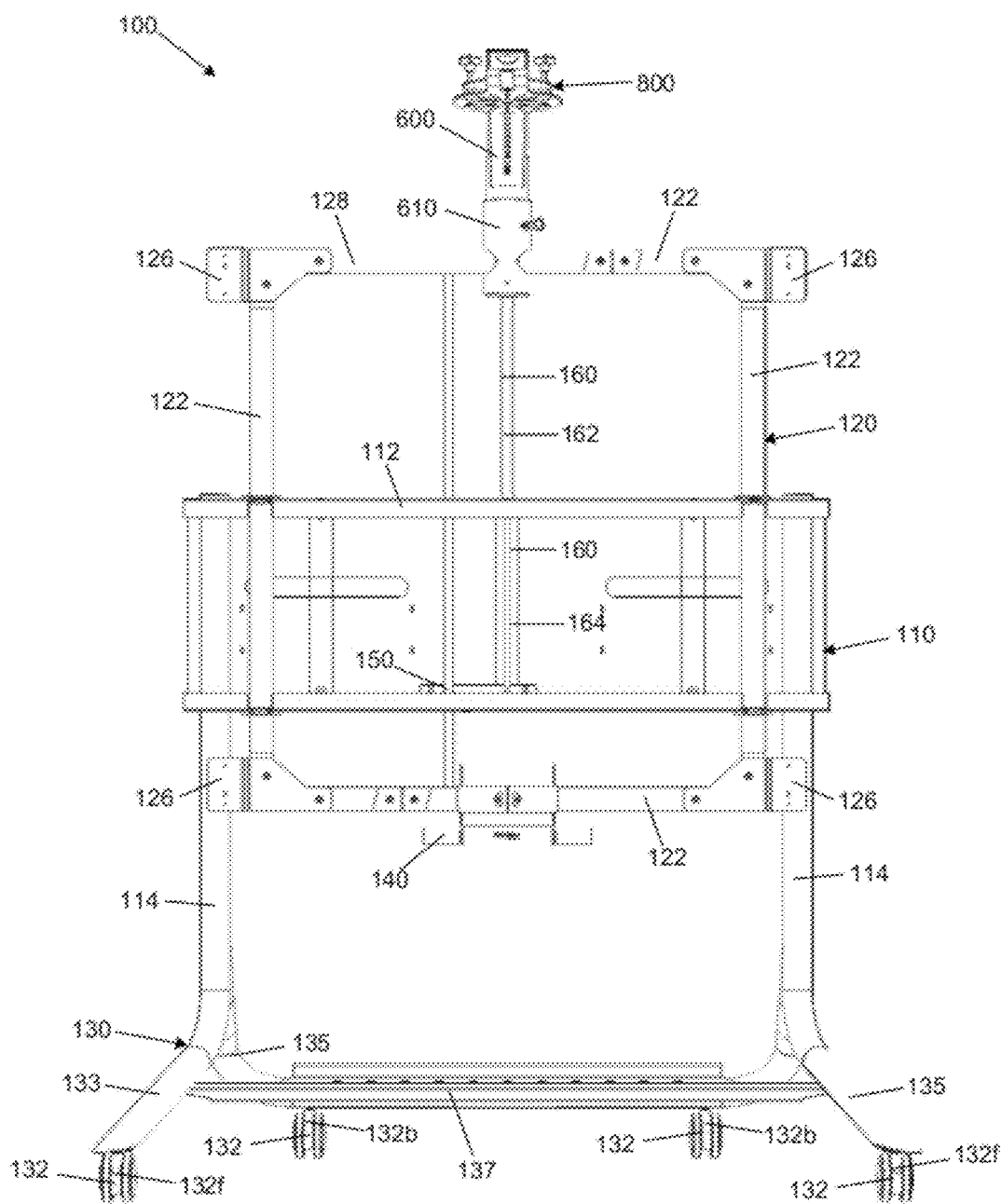
FIG. 11 illustrates a front view of the mount, according to an exemplary embodiment of the present invention.
Figure 12:
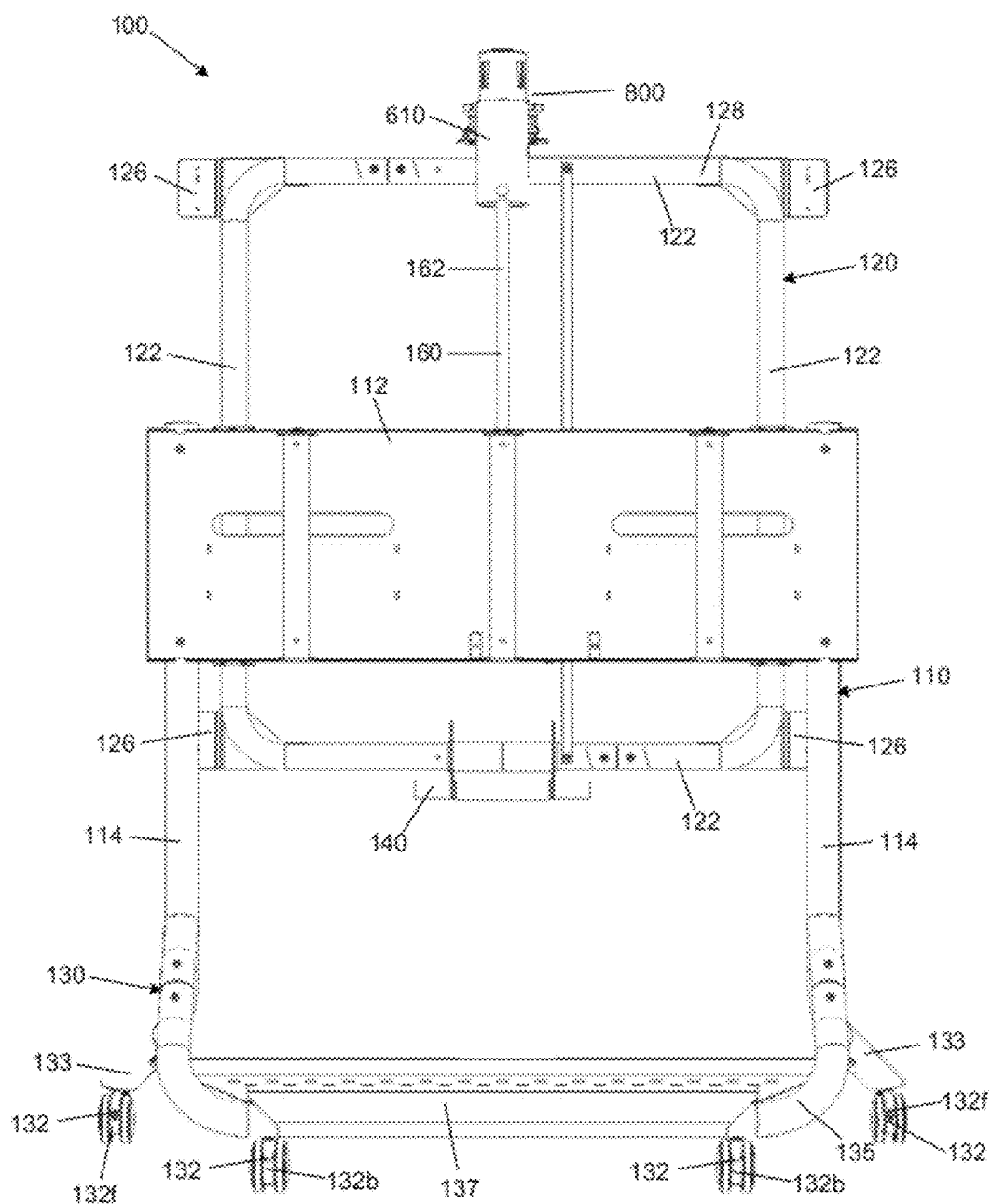
FIG. 12 illustrates a back view of the mount, according to an exemplary embodiment of the present invention.

FIGS. 10-12 illustrate, respectively, a side perspective view, a front view, and back view of an embodiment of the mount 100 of the interactive system 10, configured to stand on the floor 50, according to an exemplary embodiment of the present invention. As shown in these figures, the carriage system 120 can be in communication with the stand 110 and configured to carry the display device 200 (not shown in FIGS. 10-12) on a display support 128. The attachment between the carriage system 120 and the stand 110 can be such that the carriage system 120 is moveable relative to the stand 110. In an exemplary embodiment, the carriage system 120 can move vertically with respect to the stand 110 and can be lockable by a user. Because the stand 110 can be fixed at a constant height above the floor 50, the distance between the carriage system 120 and the floor 50 can vary as the carriage system 120 moves with respect to the stand 110. Thus, the user can adjust the height of the carriage system 120 above the floor 50 by unlocking the carriage system 120 from the stand 110, vertically moving the carriage system 120 relative to the stand 110 until the carriage system 120 reaches a desired height, and then locking the carriage system 120 back to the stand 110.

As shown in FIGS. 8-9, in addition to carrying the display device 200, the carriage system 120 can also carry the projector 300. Thus, as the carriage system 120 moves vertically relative to the stand 110, the projector 300 can also move vertically relative to the stand 110. Accordingly, the projector 300 can remain fixed with respect to the carriage system 120 and the display device 200, so that the projector 300 need not be readjusted to point at the display surface 210 whenever the carriage system 120 is moved. A short throw projector 300 can be useful in the interactive system 10 because, being attached to the carriage system 120, the projector 300 may be positioned only a short distance from the display surface 210 onto which the projector 300 projects images. A short throw projector 300 can be particularly suited to project a desirably-sized image on the display surface 210 at only a short distance from the display surface 210. Because the maximum distance between the projector 300 and the display device 200 can be limited by the configuration of the interactive system 10, a short throw projector 300 can ensure that images are projected in a desirable size.

As shown in FIGS. 10-12, the mount 100 can comprise an optional mobile base 130, a horizontal brace 112, and one or more vertical supports 114. The mobile base 130, if provided, can enable the mount 100 to be slidable across the floor 50 or other horizontal surface. The horizontal brace 112 can support a large portion of the weight of a display device 200 attached to the mount 100. The vertical supports 114 can extend upward from the mobile base 130 to the horizontal brace 112, thus connecting the mobile base 130 to the horizontal brace 112 and adding height to the vertical positioning of the display device 200.

Figure 13:
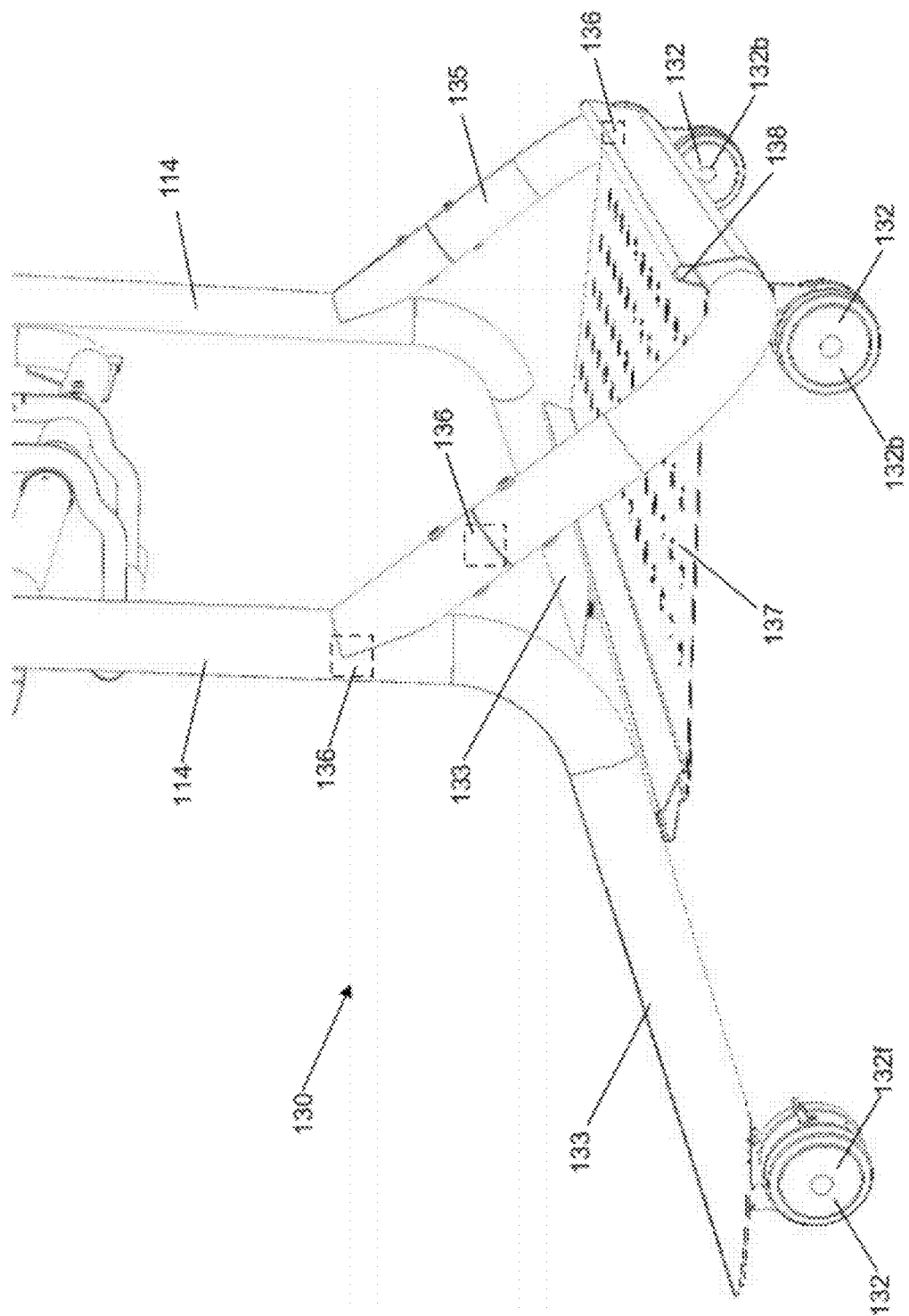
FIG. 13 illustrates a partial cross-sectional, perspective view of a mobile base of the mount, according to an exemplary embodiment of the present invention.

FIG. 13 illustrates a partial cross-sectional, perspective view of the mobile base 130. As shown in FIG. 13, the mobile base 130 can comprise one or more movement devices 132, one or more legs 133 and 135, and a support tray 137. If the interactive system 10 is configured to be mounted on a wall 60, however, no mobile base 130 need be provided, as the stand 110 of the interactive system 10 need not be mobile.

The movement devices 132 can enable movement of the mobile base 130 across the floor 50. For example and not limitation, as show, the movement devices 132 can be wheels or casters, which can be lockable to restrain movement when the user desires the mount 100 to be stationary. The casters 132, or other movement devices, can be positioned at or proximate the bottom of one or more legs of the mobile base 130.

The mobile base 130 can comprise two front legs 133 and a back leg 135. The front legs 133 can be lower portions of the vertical supports 114 of the stand 110, extending downwardly and outwardly toward the floor 50 to provide a sufficiently wide base to balance the mount 100. As shown, the back leg 135 can have a general U-shape, extending from one of the vertical supports 114 downward and outward, continuing substantially parallel to the floor 50, and then extending back upward to the other vertical support 114.

The support tray 137 can extend between the legs 133 and 135 of the mount 100, thus providing additional support and balance to the stand 110. By connecting lower portions of the legs 133 and 135 together, the support tray 137 can stiffen the mobile base 130 by constraining the spatial relationship between the legs 133 and 135. Thus, the support tray 137 can reduce or prevent the legs from splaying apart and causing the mount 100 to become unstable.

While providing some stiffness to the mobile base 130 and overall mount 100, the support tray 1307 can be secured to the legs 133 and 135 in a manner that provides enough flexibility to enable the mobile base 130 to remain substantially level over an uneven floor 50. For example, as shown, although the front casters 132*f* can be attached directly to the front legs 133, the back casters 132*b* can be attached to the support tray 137. A back portion of the support tray 137 can define a hollow cavity 138 or tube, and the substantially horizontal, lower portion of the back leg 135 can extend through the hollow cavity 138. The cavity 138 can supply more vertical space than is actually needed to receive and retain the back leg 135, thereby providing additional space above or below the back leg 135 inside the cavity 138. This additional space can be used to level the stand 110 over an uneven floor 50.

As shown in FIG. 13, in some instances, the back leg 135 can be positioned near the bottom of the cavity 138 of the support tray 137. If the stand 110 is moved to an uneven floor 50 so that the front of the stand 110 is positioned higher than the back of the stand 110, then the front legs 133, being securely and fixedly attached to the support tray 137, can cause the support tray 137 to be forced slightly upward. Consequently, the back leg 135 can be forced upward within the cavity 138 of the support tray 137, thus enabling the back leg 135 to move to the height of the front legs 133, while simultaneously enabling the support tray 137 and the back casters 132*b* to remain positioned on the floor 50. Thus, the stand 110 can maintain its balance by keeping all casters 132 on the floor 50, while remaining level as the back leg 135 lifts up along with the front legs 133 on the uneven floor 50. When the front legs 133 are lowered again, such as by moving back to a level floor 50 or by moving over uneven floor 50 in which the back leg 135 is higher, the back leg 135 can then move downward in the cavity 138 of the support tray 137, to remain level with the front legs 133. As a result, when the floor 50 is uneven with a variation of up to approximately one-quarter or one-half inch, the mount 100 can remain level.

One or more dampening mechanisms 136 can be provided in the mobile base 130 to facilitate smooth movement of the back leg 135 upward and downward within the cavity 138 of the support tray 137. For example, a spring 136 or other dampening mechanism can be provided inside the cavity 138, inside the back leg 135, or at one or both of the joints between the back leg 135 and the vertical supports 114. If provided inside the back leg 135, a spring 136 can be used to enable the back leg 135 to compress slightly upward when the front legs 133 are raised, thus enabling the bottom of the back leg 135 to move upward as necessary. If provided at the joints of the back leg 135 and the vertical supports 114, a spring 136 can enable upward compression of the back leg 135, or can enable the back leg 135 to pivot relative to the vertical supports 114 to raise the lower portion of the back leg 135 in the cavity 138 as needed.

Figure 14:
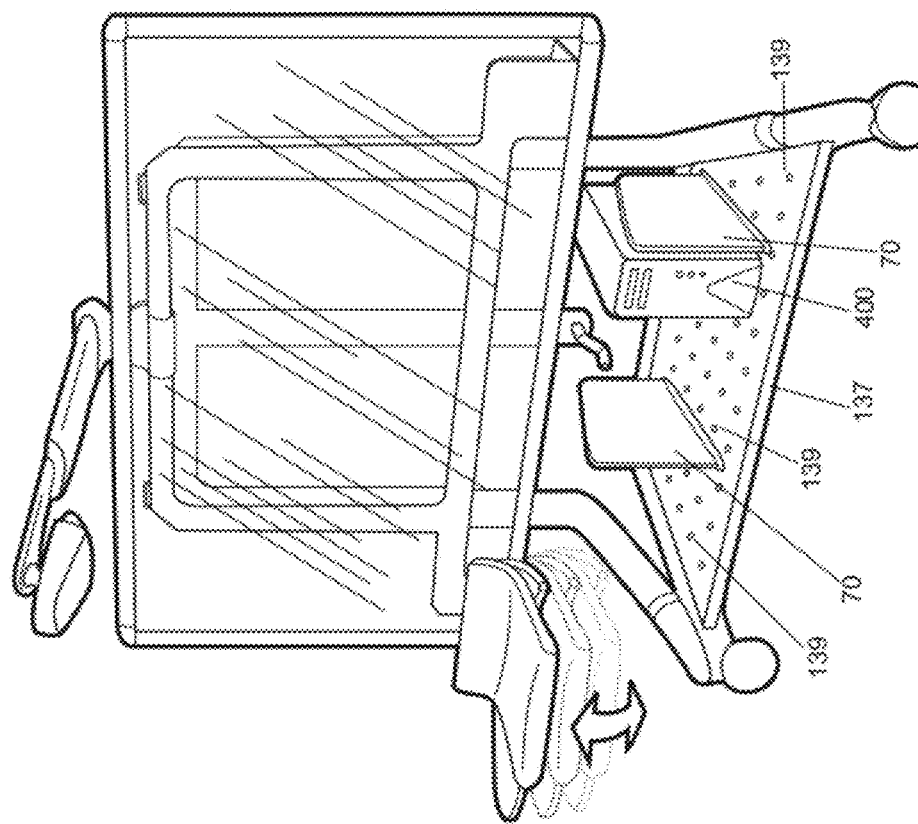
FIG. 14 illustrates a perspective view of the interactive system carrying a tray integrated into the mobile base, according to an exemplary embodiment of the present invention.

FIG. 14 illustrates another embodiment of the mount 100 of the interactive system 10, according to an exemplary embodiment of the present invention. As illustrated in FIGS. 13-14, the support tray 137 of the mobile base 130 of the mount 100 can define a plurality of apertures 139 spaced through the support tray 137. As shown in FIG. 14, these apertures 139 can be used to receive dividers 70 or other organizing devices. The dividers 70 can be used to provide storage for components that the user desires to keep near or with the interactive system 10. For example and not limitation, in some embodiments, the processing device 400 can be stored on the support tray 137 and supported by dividers 70 received by the apertures 139 in the support tray 137.

Figure 15:
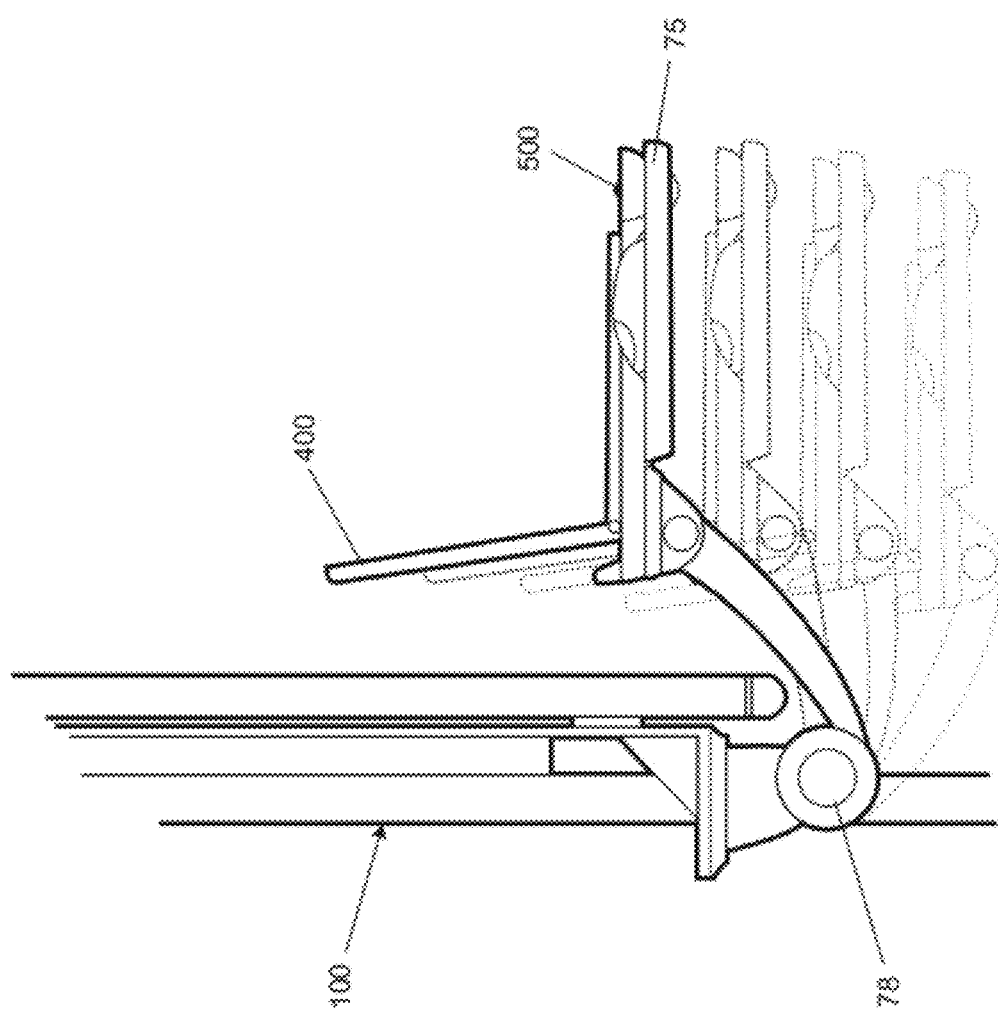
FIG. 15 illustrates a side view of a first embodiment of a utility tray of the interactive system, according to an exemplary embodiment of the present invention.

FIG. 15 illustrates a side view of a utility tray 75 of the interactive system 10, according to an exemplary embodiment of the present invention. The utility tray 75 can be provided in the interactive system 10 for additional component storage, alternatively or additionally to the dividers 70 on the support tray 137. As shown, the processing device 400, such as a notebook computer 425, can be stored in the utility tray 75. The tray 75 can also store the input device 500 when the input device 500 is not in use. Like other aspects of the interactive system 10, the utility tray 75 can be adjustable. For example and not limitation, as shown in FIG. 15, the utility tray 75 can be an articulating tray pivotable about a joint 78 that connects the utility tray 75 to the mount 100 of the interactive system 10.

Figure 16:
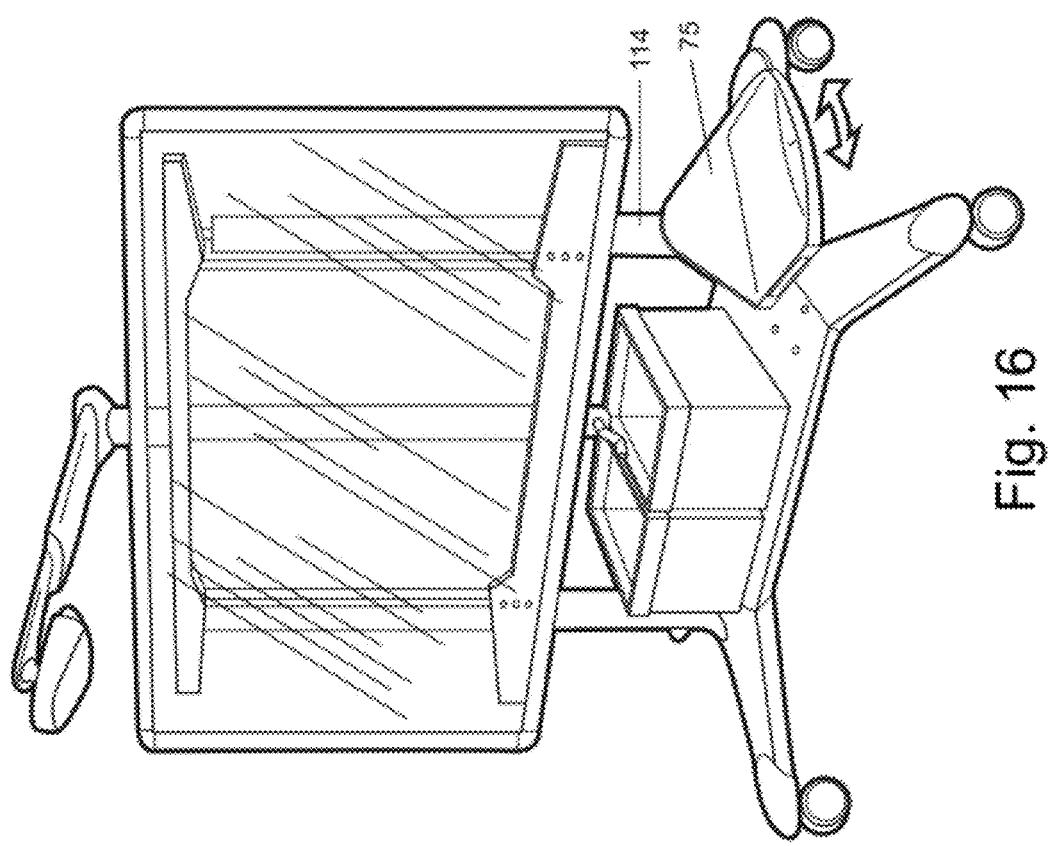
FIG. 16 illustrates a perspective view the interactive system carrying a second embodiment of a utility tray, according to an exemplary embodiment of the present invention.

The utility tray 75 embodiment of FIG. 15 is not the only possible utility tray 75 that can utilized in the interactive system 10. For another example, FIG. 16 illustrates the interactive system 10 having an alternate embodiment of the utility tray 75, according to an exemplary embodiment of the present invention. As shown in FIG. 16, the utility tray 75 can be pivotably attached to a vertical support 114 of the mount 100, and can swing horizontally about the vertical support 114 to enable the user to position the utility tray 75 as desired. Additionally, the ability of the utility tray 75 to move horizontally can enable a user to position the utility tray 75 such that the utility tray 75 does not extend the width of the interactive system 10 to beyond the width of a standard doorway. Thus, in some exemplary embodiments, with the utility tray 75 properly positioned, the entire interactive system 10 can fit through a standard doorway without disassembly.

Figure 17:
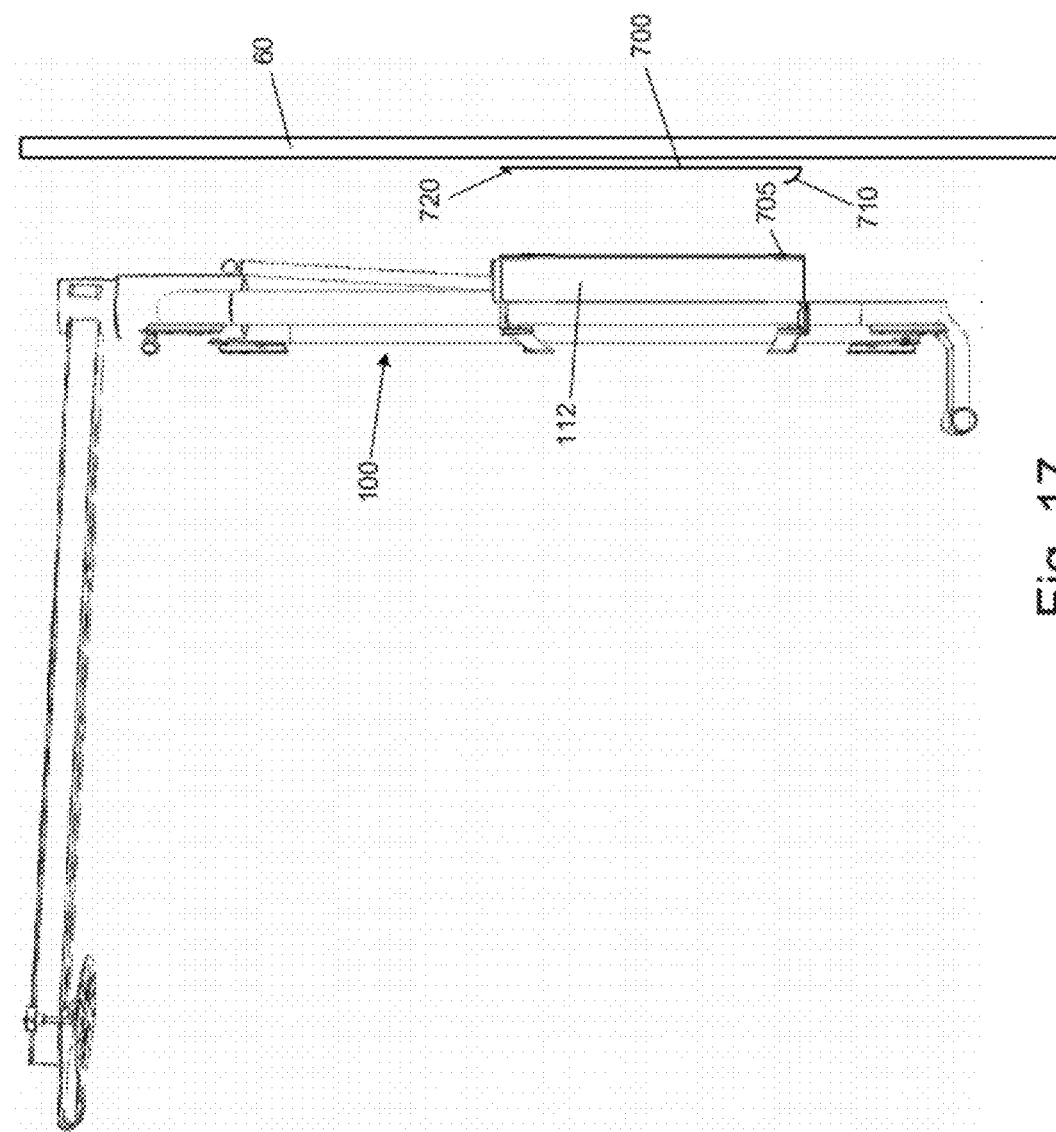
FIG. 17 illustrates a side view of a wall mount bracket for the interactive system, according to an exemplary embodiment of the present invention.

FIG. 17 illustrates a wall bracket 700 for securing the mount 100 of the interactive system 10 to a wall 60 or other vertical surface. As shown, the wall bracket 700 can comprise a first receiving member 710, which can be located proximate the bottom of the bracket 700. The first receiving member 710 of the wall bracket 700 can compliment the back of the mount 100 of the interactive system 10, so that the mount 100 can fit into or around the first receiving member 710 of the bracket 700 in some manner. For example and not limitation, in some embodiments, the backside of the mount 100 of the interactive system 10 can define a channel 705 complimentary to the first receiving member 710 of the wall bracket 700. In an exemplary embodiment, this channel 705 can run generally horizontally across the back of the horizontal brace 112 of the mount 100. The first receiving member 710 of the bracket 700 can extend upwardly and outwardly, as shown in FIG. 17, so as to fit into the channel 705 of the mount 100. The top of the mount 100 can then be secured to a second receiving member 720 of the wall bracket 700. For example, the mount 100 can be attached to the second receiving member 720 by screwing the horizontal brace 112 of the mount 100 to the second receiving member 720 of the wall bracket 700, or by snapping a top portion of the mount 100 into securement with the second receiving member 720. In an exemplary embodiment, the mount 100 can be attached to the bracket 700 in a manner that is secure enough to reduce or prevent accidental dislodgement, such as by users or by seismic activity.

As illustrated, except for the absence of the mobile base 130 of the mount 100, an exemplary mount 100 for mounting on the wall bracket 700 can be the same or similar as a mount embodiment 100 configured to stand upright on the floor 50. Thus, the stand 110 of the mount 100 can be secured to the wall 60 by the wall bracket 700, and the carriage system 120 can then be moveable with respect to the stand 110, and thus the wall 60, for adjustability of the display device 200.

Referring now back to FIGS. 10-12, the carriage system 120 can include one or more horizontal supports 122 and one or more vertical supports 124. For example, as shown, the carriage system 120 can comprise two horizontal supports 122 and two vertical supports 124, all of which can provide some support and stability for the weight of a display device 200 carried by the carriage system 120. The horizontal supports 122 can extend between the vertical supports 124, preferably being attached toward the top and bottom of the vertical supports 124.

One or more attachment points 126 can be provided on the display support 128 of the carriage system 120 for attaching the display device 200 to the carriage system 120. For example, as shown, an attachment point can be provided proximate each end of the horizontal supports 122. The display device 200 can be secured to the attachment points 126 with screws, nails, adhesives, or other securing devices. Once secured to the attachment points 126, the display device 200 can thus be secured to the carriage system 120 and moveable with the carriage system 120.

Figure 18:
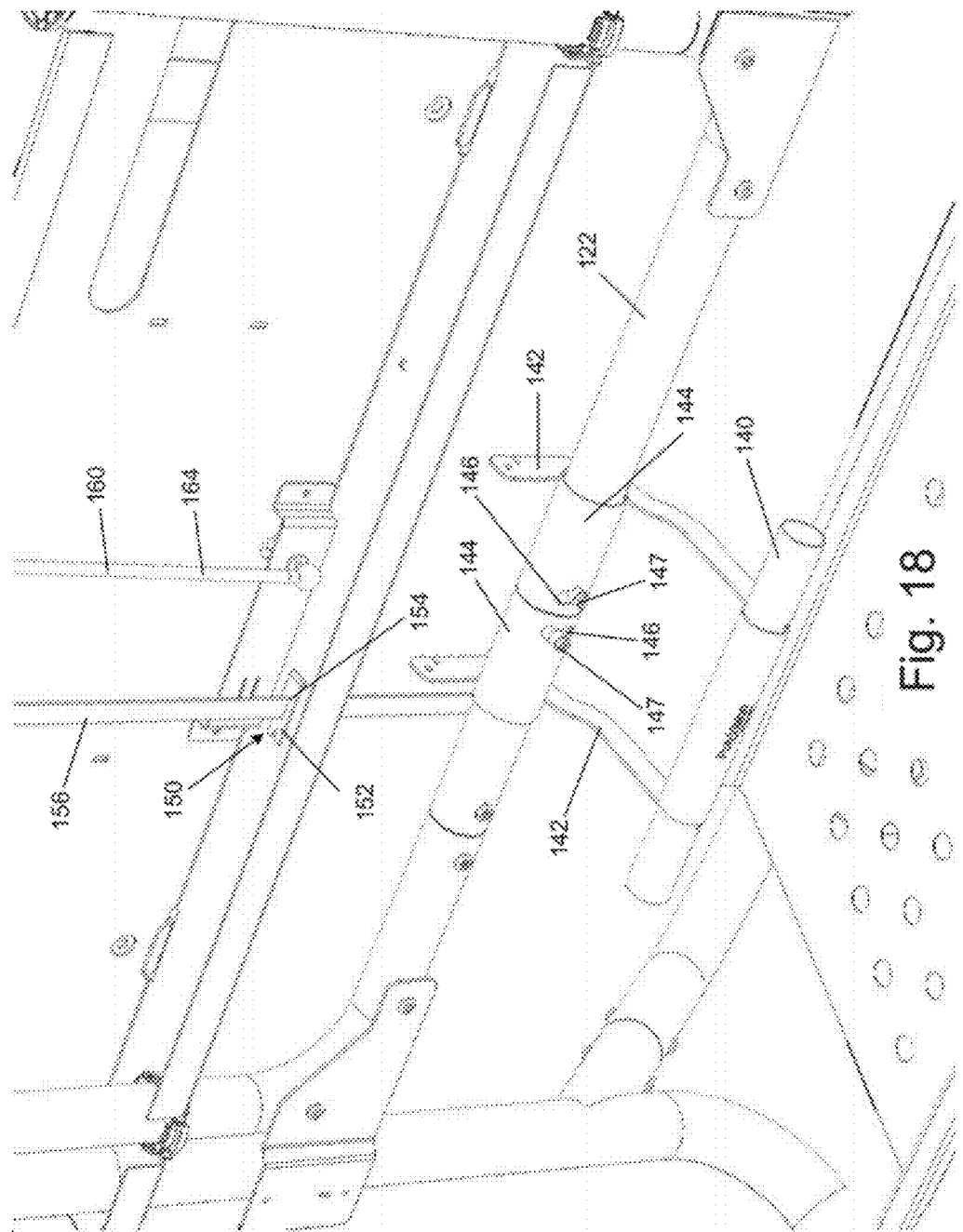
FIG. 18 illustrates a front perspective view of a locking system of the interactive system, according to an exemplary embodiment of the present invention.

FIGS. 18-19 illustrate perspective front and back views of a portion of the mount 100 containing a locking and movement mechanism. As shown in FIGS. 18-19, movement of the carriage system 120 can be facilitated by the handle 140, the lever lock 150, and the gas spring 160. The gas spring 160 is more fully illustrated in FIG. 10.

Figure 20A:
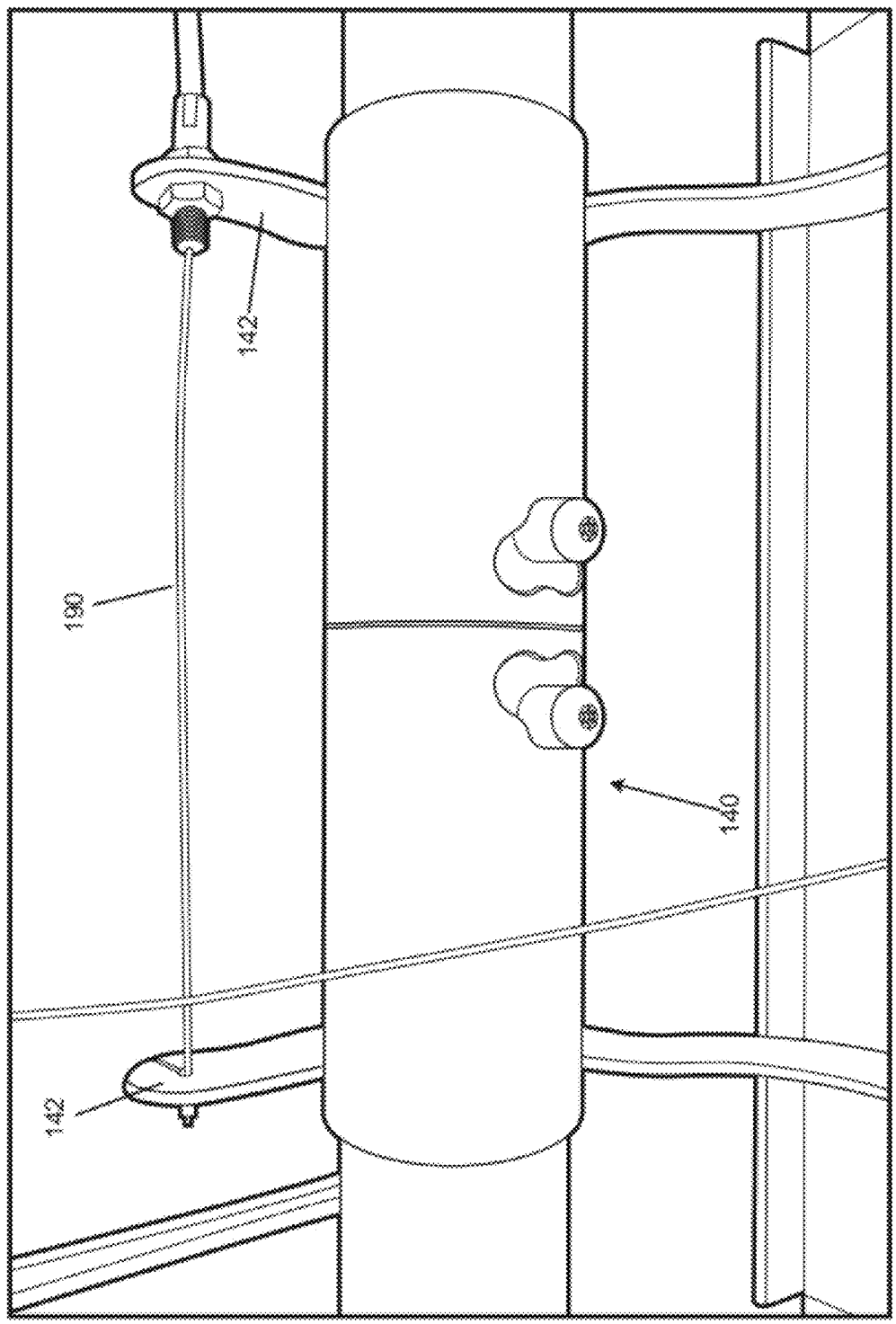
Figure 20B:
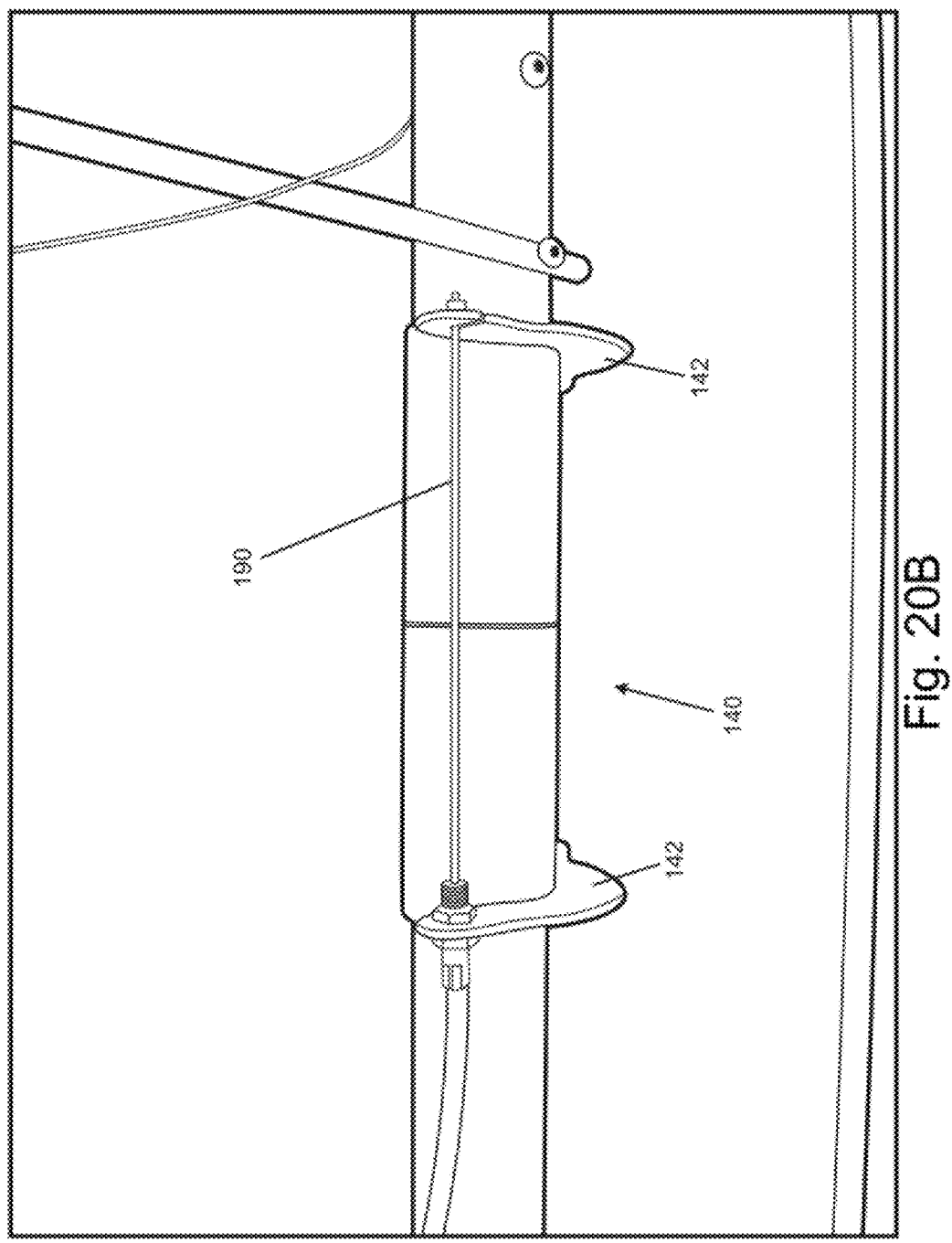
Figure 20D:
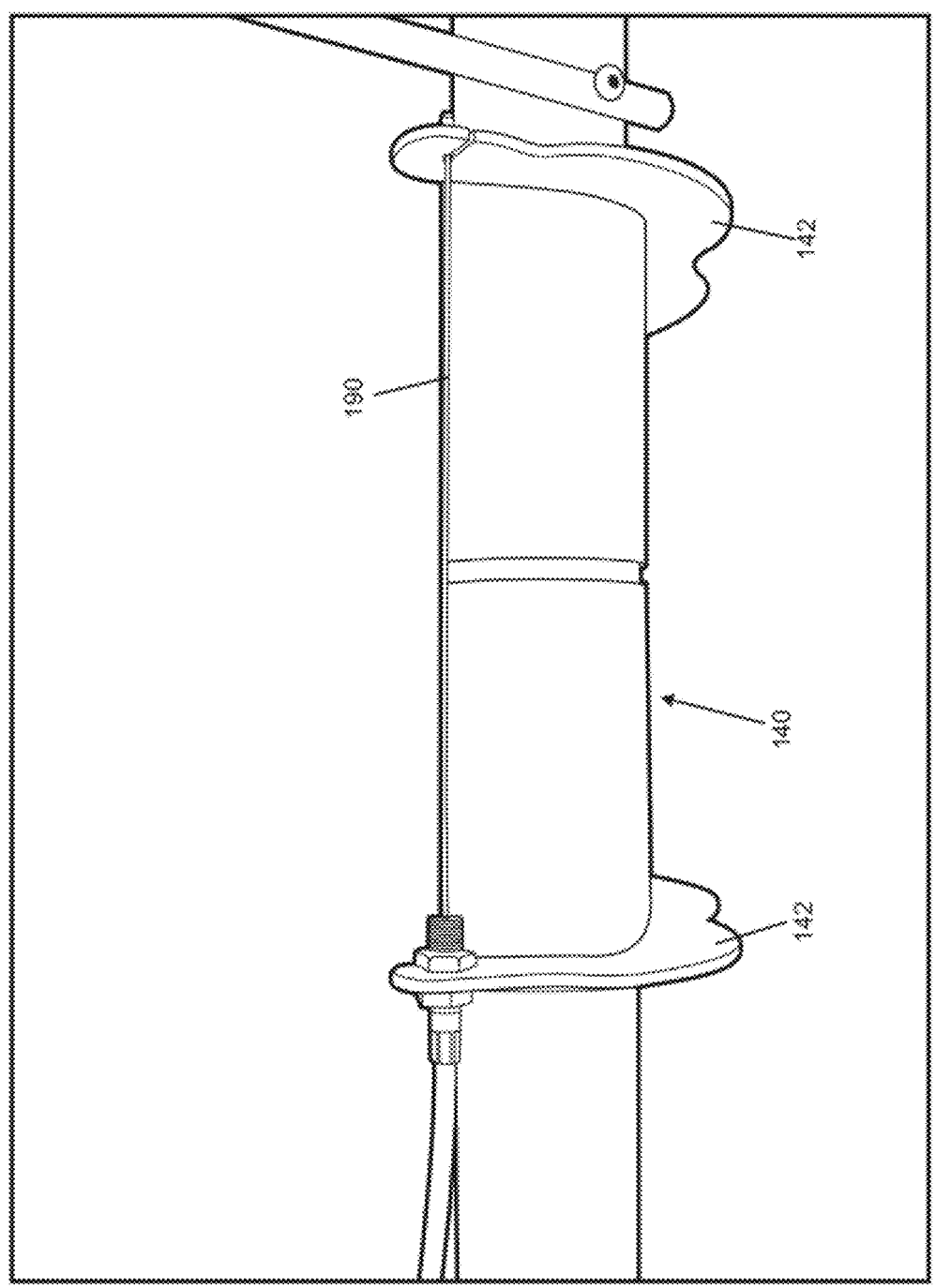
Figure 20E:
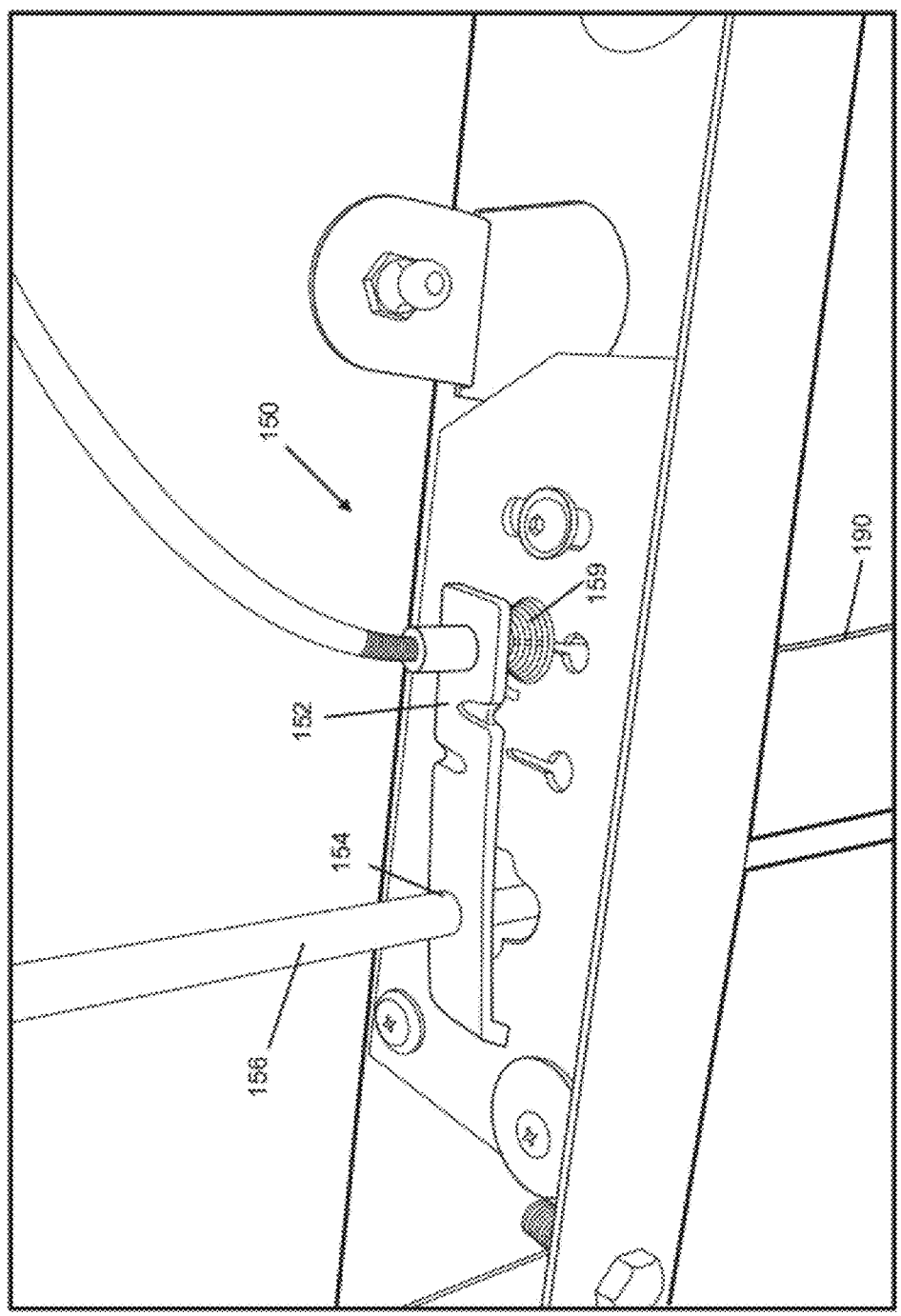

FIGS. 20A-20E illustrate an embodiment the handle 140 and lever lock 150, according to an exemplary embodiment of the present invention. More specifically, FIGS. 20A-20B respectively illustrate front and back views of the handle 140 in an equilibrium position. FIGS. 20C-20D respectively illustrate front and back views of the handle 140 after being moved away from the equilibrium position. FIG. 20E illustrates the lever lock 150 in an unlocked position, as a result of the handle 140 being away from its equilibrium position.

Referring now to FIGS. 18-19, the handle 140 can act as an actuator for the lever lock 150, which can lock the carriage system 120 to the stand 110 and unlock the carriage system 120 when desired. When unlocked, the carriage system 120 can move vertically with respect to the stand 110, while remaining in a generally vertical orientation. The gas spring 160 can provide an upward force on the carriage system 120 to assist the user in lifting the carriage system 120 upwardly, and to act against the force of gravity so that the carriage system 120, weighted down by the display device 200, does not fall downwardly too swiftly.

The handle 140 can be in communication with one or more flexible arms 142, which can be in communication with one or more rotatable members 144 on a horizontal support 122 of the carriage system 120. Unless actuated by a user, the handle 140 can generally remain at rest, in an equilibrium position. When pushed either upward or downward from the equilibrium position, the handle 140 can cause the flexible arms 142 to rotate about the horizontal support 122. The rotatable members 144, being attached to the flexible arms 142, can also rotate about the horizontal support 122 of the carriage system 120 upon actuation of the handle 140.

Each of the rotatable members 144 can define an aperture 146, through which an extending member 147 can extend outward from the horizontal support 122. When the handle 140 is at equilibrium, each extending members 147 can extend through an intermediate portion of the corresponding aperture 146. Above and below the intermediate portion of the aperture 146, the aperture 146 can curve inward toward the other rotatable member 144, thus forming a C-shape, a U-shape, or the like. The rotatable members 144 can be configured to slide along the horizontal support 122, so that when the handle 140 is actuated, the rotatable members 144 can rotate and be forced to slide outward along the horizontal support 122, so that the apertures 146 remain aligned with the extending members 147. Being flexible relative to the handle 140, the flexible arms 142 can allow the rotatable members 144 to move outward in the manner. For example, the flexible arms 142 can be made of a flexible material, or can be pivotably attached to the handle 140, so as to enable the flexible arms 142 to flex when the rotatable members 144 are forced outward.

As shown in FIGS. 20A-20E, an elongated connective member 190, such as a cable or wire, can extend from the handle 140 to the lever lock 150. The cable, as depicted in FIGS. 20A-20D, can extend between the flexible arms 142 of the handle 140. When the handle 140 is moved away from equilibrium, the flexible arms 142 separate further, thus causing the distance that the cable 190 extends between the flexible arms 142 to increase. Resultantly, tension in the cable 190 can increase when the handle is moved away from its equilibrium.

The lever lock 150 can lock and release the carriage system 120 with respect to the stand 110. As shown, the lever lock 150 can comprise a lever 152 and a slidable member 156. The ends of the slidable member 156 can be attached to the carriage system 120. For example, as shown in FIG. 10, the top end of the slidable member 156 can attach to the upper horizontal support 122 of the carriage system 120, and the bottom end of the slidable member 156 can attach to the lower horizontal support 122 of the carriage system 120. Thus, in order for the carriage system 120 to move upwardly or downwardly, the slidable member 156 must also move upwardly or downwardly.

Referring to FIGS. 18 and 20E, when the handle 140 is in the equilibrium position, the lever 152 can be angled slightly upwardly. The lever 152 can define an aperture 154 through which the slidable member 156 extends. When the lever 152 is angled upwardly, the lever 152 can be in a locked position because the aperture 154, or slit, is angled upwardly and is thus tightly fitted about the slidable member 156. Resultantly, the friction between the lever 152 and the slidable member 156 is high enough so as to prohibit, or at least substantially limit, the slidable member's movement through the aperture 154 of the lever 152. Thus, when the lever 152 is angled upwardly, the slidable member 156 cannot move, or has substantially limited movement ability. Because the slidable member 156 can be attached to the carriage system 120 as discussed above, the restriction in movement of the slidable member 156, caused by the upwardly angled lever 152, likewise restricts the movement of the carriage system 120. Thus, when the lever 152 is angled upwardly, the vertical position of the carriage system 120 with respect to the stand 110 can be locked.

The lever lock 150 can be in communication with the handle 140 via the cable 190, which can extend from the handle 140 to the lever lock 150, interacting with the lever lock 150 as illustrated in FIG. 20E. When the tension in the cable 190 increases, such as by the handle 140 being moved away from equilibrium, the cable 190 can pull the lever 152 downwardly. This downward movement of the lever 152 can be dampened by a spring 159 positioned between the lever 152 and the horizontal brace 112. When the lever 152 pivots downwardly, the aperture 154 in the lever 152 can provide more space in the horizontal direction, so as to reduce friction between the lever 152 and the slidable member 156. The slidable member 156 can then move, or slide, through the aperture 154 of the lever 152. Consequently, when the handle 140 is not in its equilibrium position, after being moved upwardly or downwardly, the lever 152 can pivot, thus unlocking the lever lock 150 and enabling the carriage system 120 to be moved vertically with respect to the stand 110.

The gas spring 160 can apply an upward pressure to the carriage system 120 to, at least partially, counteract the force of gravity, thereby preventing the carriage system 120 from falling downwardly too quickly when the lever lock 150 is unlocked. As illustrated in FIG. 10, the gas spring 160 can comprise a canister 162 and a compressor 164. The canister 162 can contain a compressible gas, providing a force that pushes the compressor 164 outward to extend the gas spring 160 to its longest configuration. Thus, to shorten the total length of the gas spring 160, one must push the compressor 164 into the canister 162 with a force greater than that with which the gas pushed the compressor 164 out of the canister 162.

A first end of the gas spring 160 can attach to the carriage system 120, while a second end of the gas spring 160 can attach to the stand 110. For example, as shown in FIG. 10, an end of the canister 162 can attach to the upper horizontal support 122 of the carriage system 120, while an end of the compressor 164 can attach to a lower portion of the horizontal brace 112 of the stand 110.

When the handle 140 is actuated to unlock the carriage system 120 from the stand 110, the gas spring 160 can apply an upward force on the carriage system 120, unless the gas spring 160 is already fully extended. Thus, the gas spring 160 can at least partially counteract the force of gravity, thereby preventing the carriage system 120 from falling downward unhindered when the carriage system 120 is unlocked. When the carriage system 120 is unlocked, a user can either lift the carriage system 120 and the display device 200 upwardly with the assistance of the gas spring 160, or the user can push the carriage system 120 and the display device 200 downwardly against the force of the gas spring 160.

Because, as discussed above, the carriage system 120 can be unlocked by either upward or downward movement of the handle 140, the handle 140 can be used intuitively to vertically reposition the carriage system 120. For example, a user's pushing the handle 140 upwardly can both unlock the carriage system 120 and force the carriage system 120 upwardly. Analogously, pushing the handle 140 downwardly can both unlock the carriage system 120 and force the carriage system 120 downwardly.

In an alternative embodiment of the mount 100, the handle 140 can be replaced with a crank 170, which is shown in FIGS. 8-9. The crank 170 can operate in a manner similar to the handle 140, where the crank 170 can control the lever lock 150 to lock and unlock the carriage system 120. Alternatively, however, another unlocking mechanism can be provided and controlled by the crank 170. For example and not limitation, the crank 170 can control a set of one or more gears configured to lift and lower the carriage system 120 as desired by the user.

FIG. 21 illustrates a perspective view of a boom 600 and projector mount 800 for carrying a projector 300 of the interactive system 10. As shown in FIG. 21, the boom 600 can extend outwardly from the mount 100 for carrying the projector 300. For example, as illustrated, the boom 600 can be attached to the carriage system 120. The boom 600 can be both laterally and pivotably moveable with respect to one or more other portions of the carriage system 120, such as the display support 128, to enable a user to adjust the position of a projector 300 relative to the display device 200 mounted on the carriage system 120.

The boom 600 can be attached to a turret 610, which can be attached to the carriage system 120. The turret 610 can comprise a base 612 and a rotational portion 614. The base 612 of the turret 610 can define an aperture 617 through which the upper horizontal support 122 of the carriage system 120 can extend, thereby connecting the turret 610 to the carriage system 120. With the horizontal support 122 extending through the aperture of the turret base 612, the turret 610 can slide laterally along the length of the horizontal support 122, in a direction generally perpendicular to the direction in which the carriage system 120 faces. Being connected to the turret 610, the boom 600 can also slide laterally along the length of the horizontal support 122.

A locking mechanism 618 can be provided on the turret 610 to increase the friction between the turret 610 and horizontal support 122, when tightened or otherwise secured by the user. For example and not limitation, the locking mechanism 618 can comprise a screw extending through the turret base 614 that, when tightened, exerts a force on the horizontal support 122 to increase friction between the turret base 614 and the horizontal support 122. The increase in friction can limit or prevent the potential lateral movement of the turret 610, thereby locking the turret 610 in place in a position along the horizontal support 122. Releasing the locking mechanism 618 can reduce this friction, thereby enabling movement when the user supplies adequate force to reposition to the turret 610 along the horizontal support 122. Thus, the turret 610 and the boom 600 can be moveable along the horizontal support 122 and locked into place as desired for adjustment.

The rotational portion 614 of the turret 610 can rotate relative to the turret base 612. In some embodiments, a governor 615 can be in communication with the turret 610 to control and stabilize rotation of the rotational portion 614 of the turret 610. The boom 600 can be attached to the rotational portion 614, and when the rotational portion 614 rotates, the boom 600 can thus pivot about the turret 610. As a result, the boom 600 can achieve various angles with respect to the carriage system 120.

As will be described in more detail later, various components of the interactive system 10 can be packaged together by a manufacturer or other entity and then easily assembled by a user. To facilitate efficient securement of the boom 600 to turret 610 during assembly, a bent washer 620 can be packaged with components of the interactive system 10. FIG. 22 illustrates a perspective view of the assembled turret 610, and FIG. 23 illustrates a partially-exploded view of the turret 610 before complete assembly.

As shown in FIGS. 21-23, the boom 600 can fit through an aperture 605 defined by the turret 610. The bent washer 620 can be provided with the unassembled interactive system 10, so as to assist in securing the boom 600 in a position fitted through the aperture 605 of turret 610. As shown in FIG. 23, the washer 620 can be approximately the size and shape of an opening 615 in the top of the turret 610. The washer 620 can be initially bent, such as along a visible or virtual line that runs approximately along the approximate center of the washer 620, when packaged with the unassembled interactive system 10. During assembly, a user can place the bent washer 620 in the opening 615 provided at the top of the turret 610, such that the bent washer 620 opens downward. Although the washer 620 can be approximately the size of the opening 615, the bent washer 620 can fit into the opening 615 of the turret 610 relatively easily as, being bent, the washer 620 may not extend all the way to the sides of the opening 615.

The user can then secure the bent washer 620 by driving a screw 630 through the washer 620 into the turret 610, thereby securing the boom 600 to the turret 610. As the screw 630 is forced downward into the turret 610, the bend in the washer 620 can gradually flatten out as the washer 620 is pressed against the turret 610. When the screw 630 is firmly secured into the turret 610, the washer 620 can be substantially flat and can extend to the sides of the opening 615 in the turret 610. The washer 620 can then be tightly fitted into the opening 615 of the turret 610, securing the boom 600 to the turret 610.

Figure 24:
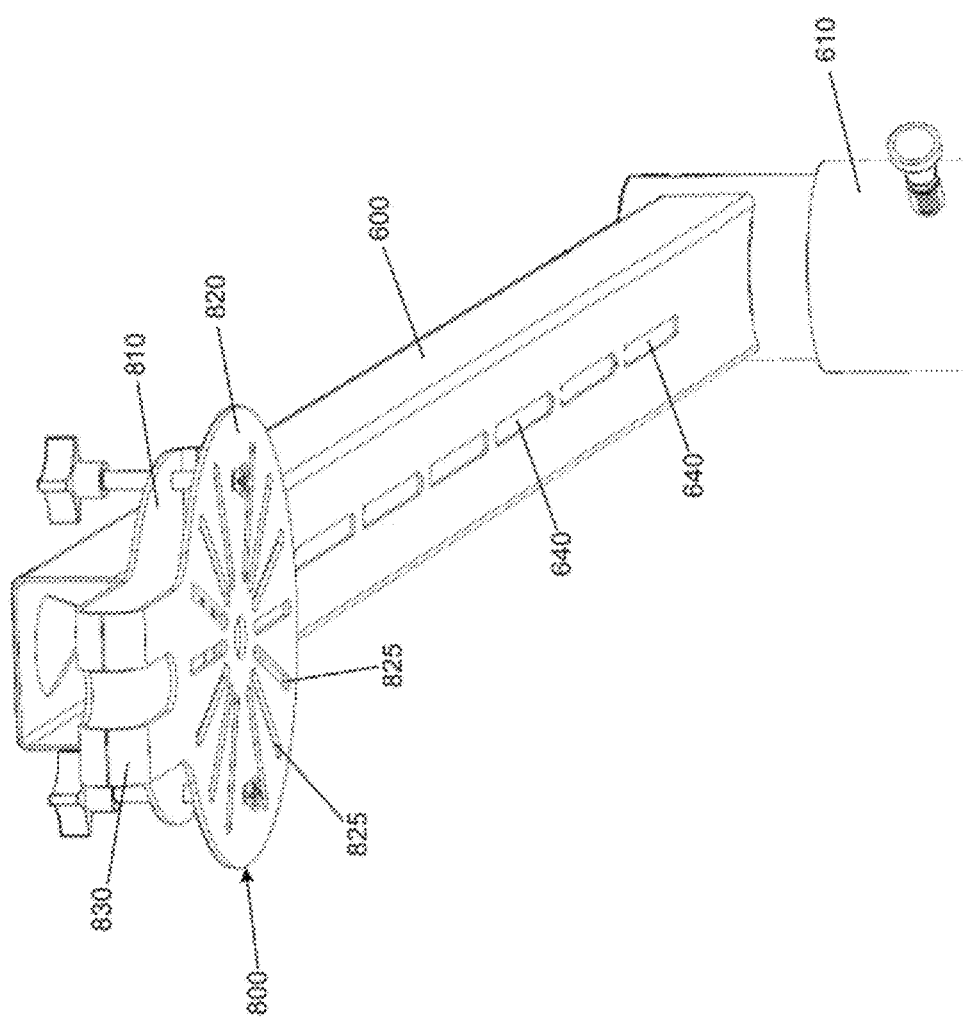
FIG. 24 illustrates a bottom perspective view of a projector mount on the boom of the interactive system, according to an exemplary embodiment of the present invention.

A projector mount 800 can be secured to the boom 600 and can carry the projector 300 during operation of the interactive system 10. FIGS. 24-25 illustrate, respectively, top and bottom perspective views of the projector mount 800 on the boom 600. As shown in FIG. 24, the boom 600 can define one or more lower openings 640, for example, in the underside of the boom 600, as shown, for receiving the projector mount 800. In an exemplary embodiment, the projector mount 800 can attach to the boom 600 in a quick and convenient manner. For example, a single screw can secure the projector mount 800 to a desired lower opening 640 of the boom 600. Providing numerous lower openings 640, as in the depicted embodiment, can provide options for positioning the projector mount 800 and the projector 300 at various distances from the display device 200. The boom 600 can further define one or more upper openings 650, visible in FIG. 25, to enable convenient access to the screw or other connective member securing the projector mount 800 to the boom 600. The upper openings 650 can also act as cable pass-throughs, whereby cables can be fed through one or more of the upper openings 650 to reach the projector 300.

As shown, the projector mount 800 can have a folded configuration, in which top and bottom layers 810 and 820 can be substantially parallel to each other, with the top layer 810 being positioned above the bottom layer 820. Between the top and bottom layers 810 and 820, an intermediate portion 830 of the projector mount 800 can bend downward from the top layer 810 to meet the bottom layer 820 of the projector mount 800, forming an approximate U-shape. The folded configuration of the projector mount 800 can enable the projector 300 to be positioned beneath the boom 600 when mounted on the projector mount 800. Resultantly, the boom 600 can remain out of the space between the projector 300 and the display device 200, so as to reduce or eliminate potential obstruction of a projected image by the boom 600.

The bottom layer 820 of the projector mount 800 can define a plurality of mounting apertures 825, slits, or openings configured to receive the projector 300. The projector 300 can attach to a desired one of the mounting apertures 825, so as to achieve a corresponding, desired orientation of the projector 300 based on the selected mounting aperture 825. Each mounting aperture 825 can result in a different orientation of the projector 300. For example and not limitation, in some exemplary embodiments, the projector 300 can have threaded bosses at or near its top. Thumbscrews can be inserted through the mounting apertures 825 and then threaded into the bosses of the projector 300 to secure the projector 300 to the projector mount 800. The angular adjustability of the projector mount 800 can function similar to a tripod, via screws (e.g., jackscrews) and the folded, intermediate portion 830 of the projector mount 800.

Accordingly, the position and orientation of the projector 300 with respect to the display device 200 can be determined by the lateral position of the turret 610, the angle of the rotational portion 614 of the turret 610, and the orientation of the projector 300 as attached to the projector mount 800. By selectively adjusting these characteristics of the interactive system 10, a user can achieve a wide range of desired positions and orientations of the projector 300. As a result, the user can avoid keystoning and can realize a desired effect of projecting an image onto the display surface 210 of the display device 200.

For the convenience of the user, various components of the interactive system 10 described above can be packaged together in a manner designed to enable relatively easy assembly. For example, a user can purchase together the mount 100; the mount 100 and the projector 300; the mount 100, the projector 300, and the input device 500; the mount 100, the display device 200, and the input device 500; the mount 100, the display device 200, the projector 300, and the input device 500; or various other combinations of the components of the interactive system 10. Also included for combined purchase can be, for example, one or more of the processing device 400 or audio equipment for use with the interactive system 10. When purchasable together, components can be packaged together in a single box, having a single universal product code (UPC). In an exemplary embodiment, one or more of these components can be collapsible, so that the box for these components can be less than approximately one or two feet deep.

In an exemplary embodiment, complete setup and installation of the components of the interactive system 10 packaged together can take no more than approximately ten minutes and can require one or two persons. Thus, the materials used in manufacturing the interactive system 10 can be as light as possible to achieve the purposes of the various components. Additionally, one or more of the components can be collapsible, so as to enable them to be stored in a box taking up minimal space, while also enabling them to be easily expanded to their useful configurations.

Figure 26A:
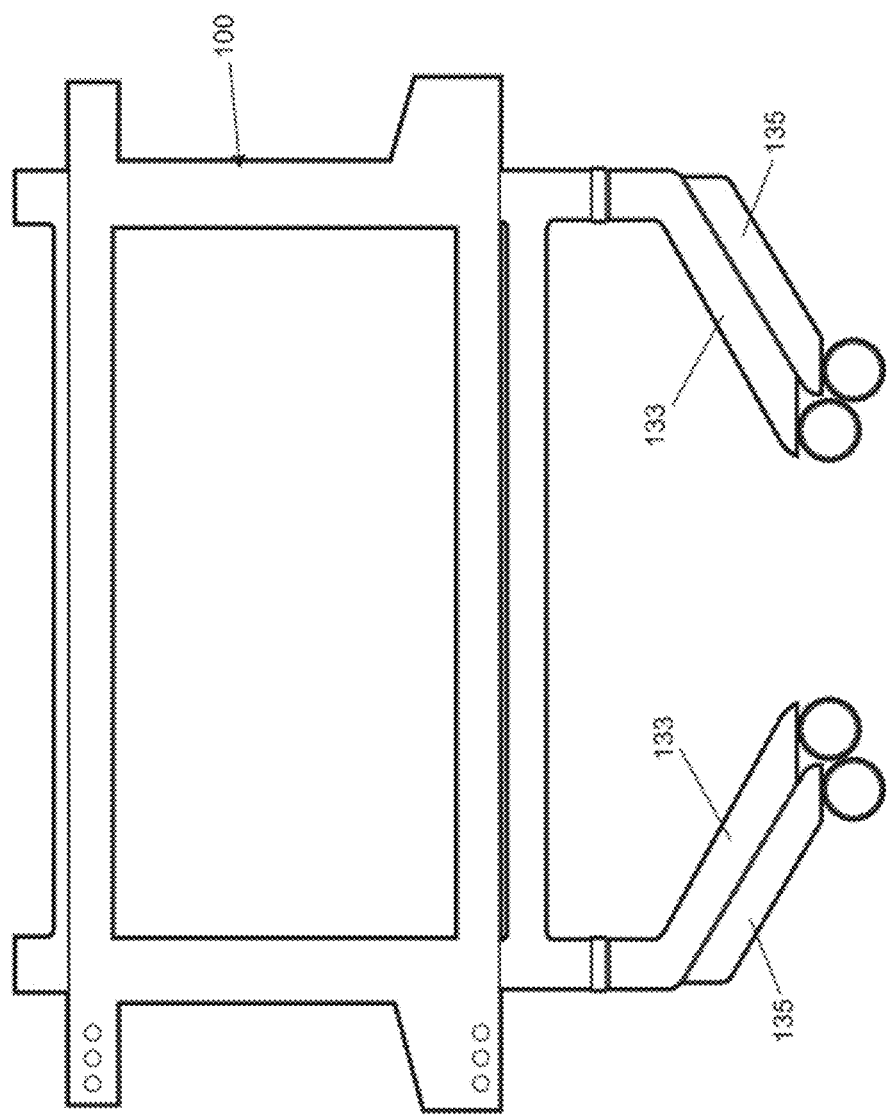
FIG. 26A illustrates a mount of the interactive system in a collapsed state, according to an exemplary embodiment of the present invention.
Figure 26B:
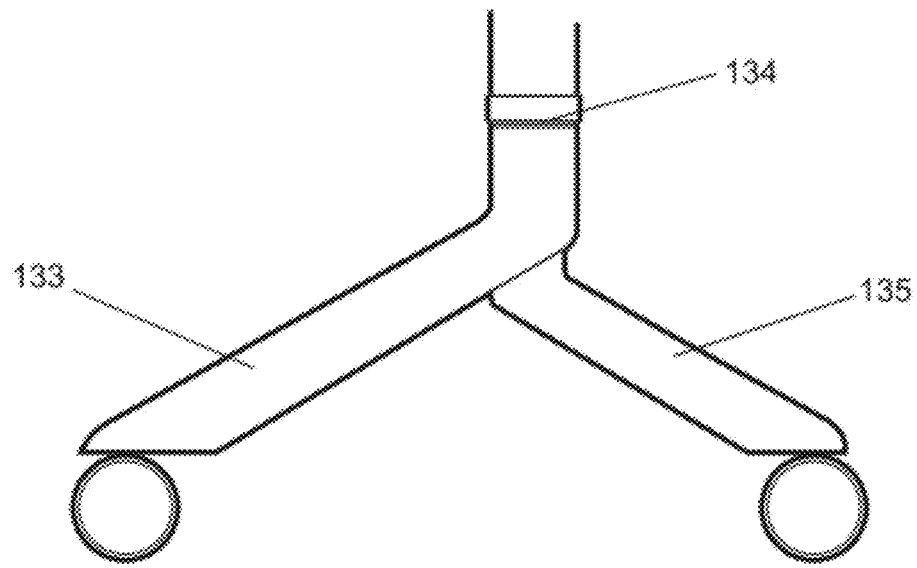
FIGS. 26B-26C illustrate views of collapsible legs of the mount of the interactive system, according to an exemplary embodiment of the present invention.
Figure 26C:
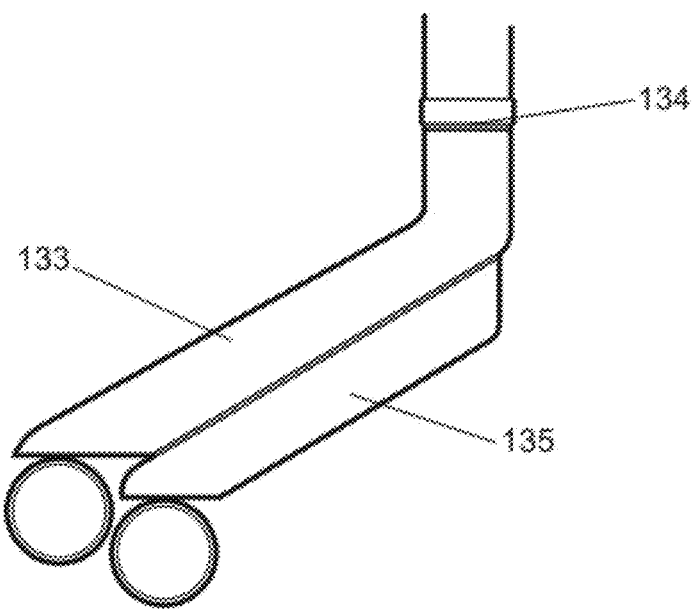

For example and not limitation, FIG. 26A illustrates how the mount 100 of the interactive system 10 can be collapsed for packaging purposes. As shown, the legs 133 and 135 of the mount 100 can fold over, so as to make the mount 100 flatter than when in use. FIGS. 26B-26C illustrate more closely how the legs 133 and 135 can collapse to produce the mount 100 shown in FIG. 26A. As shown, each of pair of legs 133 and 135 can comprise a pivot point 134, about which the legs 133 and 135 can independently rotate. In some embodiments, a pair of legs can be lockable, so as to enable the legs to remain in a currently-desired position, such as spread apart for use. When unlocked, one of each pair of legs 133 and 135 can pivot until it aligns with the other leg 133 or 135. The pair of two legs can pivot until the two legs lie substantially within a plane, or until the separate planes of the two legs lie within approximately 15 degrees of each other. Consequently, the legs 133 and 135 can be packaged in a box, so as to take up less space in the box than if the legs 133 and 135 remained in their final, installed configuration.

While various embodiments of the interactive system 10 have been disclosed in exemplary forms, many modifications, additions, and deletions can be made without departing from the spirit and scope of the invention and its equivalents, as set forth in claims to be filed in a later non-provisional application.

What is claimed is:

1. A mount comprising:
    a stand having a first leg and a second leg pivotably attached to each other, the first leg being foldable toward the second leg;
    a carriage system moveably attachable to the stand and vertically adjustable with respect to the stand;
    a display support attachable to or integrated with the carriage system, for carrying a display device; and
    a boom extendable outwardly from the carriage system and configured to carry a projector directed toward the display device.

2. The mount of claim 1, wherein the stand, the carriage system, and the boom are packaged together for sale.

3. The mount of claim 1, being packaged together with at least one of an input device, a display device, and a projector for joint sale.

4. The mount of claim 1, the stand further comprising a third leg and fourth leg pivotably attached to each other, the third leg being foldable toward the fourth leg.

5. The mount of claim 1, the first and second legs being lockable in a fixed position with respect to each other.

6. The mount of claim 1, the boom being pivotable with respect to the carriage system.

7. The mount of claim 6, the boom being horizontally pivotable with respect to the carriage system.

8. The mount of claim 1, the boom being slidable with respect to the carriage system.

9. The mount of claim 1, further comprising a projector mount attachable to the boom and configured to carry the projector.

10. The mount of claim 9, the boom comprising a plurality of mount receivers for receiving the projector mount in a selected one of a plurality of positions.

11. The mount of claim 9, the projector mount comprising a plurality of projector receivers for receiving the projector at a selected one of a plurality of positions.

12. The mount of claim 9, the projector mount comprising a first layer and a second layer, the second layer positioned below the first layer and configured to receive the projector at a height below the height of the boom.

13. The mount of claim 1, the mount being collapsible.

14. The mount of claim 2, the first and second leg being positioned within approximately fifteen degrees of each other when packaged together with the stand, the carriage system, and the boom.

* * * * *